US009239997B2

(12) United States Patent
Bobo et al.

(10) Patent No.: US 9,239,997 B2
(45) Date of Patent: Jan. 19, 2016

(54) REMOTE ENVIRONMENTAL AND CONDITION MONITORING SYSTEM

(71) Applicant: The United States of America as represented by the Secretary of the Navy, Washington, DC (US)

(72) Inventors: Jerry Lee Bobo, Camarillo, CA (US); Regina Lee Powell, Ventura, CA (US); Patricia Louise Johnson, Colorado Springs, CO (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 32 days.

(21) Appl. No.: 14/216,442

(22) Filed: Mar. 17, 2014

(65) Prior Publication Data

US 2014/0266712 A1 Sep. 18, 2014

Related U.S. Application Data

(60) Provisional application No. 61/801,201, filed on Mar. 15, 2013.

(51) Int. Cl.
*G08B 1/08* (2006.01)
*G06Q 10/06* (2012.01)
*G06Q 10/08* (2012.01)

(52) U.S. Cl.
CPC ............. *G06Q 10/06* (2013.01); *G06Q 10/08* (2013.01)

(58) Field of Classification Search
CPC .................. G06K 2017/0045; G08B 29/046; G06Q 10/08
USPC ............................ 340/539.26, 588, 602, 584
See application file for complete search history.

(56) References Cited

U.S. PATENT DOCUMENTS 5,481,245 A * 1/1996 Moldavsky .................. 340/540
5,936,523 A * 8/1999 West ........................ 340/545.6
(Continued)

FOREIGN PATENT DOCUMENTS

CA        2333346 A1    7/2001
WO     WO2013/057630    4/2013

OTHER PUBLICATIONS

VeriTrainer radiation detector for intermodal shipping containers; Amptek, Inc., R.H. Redusa, M. Alloto D. Sperry, T. Pantazis; http://www.sciencedirect.com/science/article/pii/S0168900207006572; 2007.
(Continued)

*Primary Examiner* — Toan N Pham
(74) *Attorney, Agent, or Firm* — Christopher A. Monsey

(57) ABSTRACT

The present disclosure relates to systems and processes for environmental and condition monitoring of containerized assets. One illustrative system includes containers that are configured to enclose assets that are potentially hazardous and/or potentially sensitive to electromagnetic (EM)/radio frequency (RF) radiation or emissions. The assets may also be sensitive to various environmental conditions such as temperature, humidity, shock and vibration. An exemplary system uses sensors to measure and track these environmental conditions inside a container for up to multiple years. An illustrative system may also use sensors to measure attributes of the asset. An illustrative system is configured to archive and report on the collected data. An illustrative system includes the ability to issue a warning when an asset may have been compromised. Additionally, the collected data may be used in predictive life analyses. More particularly, the collected data may be analyzed and compared to thresholds for container assets to reach deductive or inductive conclusions about the probability of damage, maintenance needs, or replacement needs.

47 Claims, 24 Drawing Sheets

(56) References Cited

U.S. PATENT DOCUMENTS

| | | | |
|---|---|---|---|
| 6,252,505 | B1 | 6/2001 | Bade |
| 6,862,499 | B1 | 3/2005 | Cretella et al. |
| 6,927,688 | B2 | 8/2005 | Tice |
| 6,986,294 | B2 | 1/2006 | Fromme et al. |
| RE38,985 | E | 2/2006 | Boatman et al. |
| 7,009,517 | B2 | 3/2006 | Wood |
| 7,148,796 | B2 * | 12/2006 | Joy et al. ............... 340/521 |
| 7,174,277 | B2 | 2/2007 | Vock et al. |
| 7,212,955 | B2 | 5/2007 | Kirshenbaum et al. |
| 7,394,363 | B1 | 7/2008 | Ghahramani |
| 7,490,637 | B2 * | 2/2009 | Speasl et al. ................. 141/98 |
| 7,495,558 | B2 | 2/2009 | Pope et al. |
| 7,675,409 | B2 | 3/2010 | Jensen et al. |
| 7,986,224 | B2 | 7/2011 | Joy et al. |
| 8,033,237 | B2 | 10/2011 | Havens et al. |
| 8,082,115 | B2 | 12/2011 | Bechhoefer et al. |
| 8,947,230 | B1 * | 2/2015 | Gettings et al. ............ 340/540 |
| 2003/0016128 | A1 | 1/2003 | Lutz et al. |
| 2003/0115956 | A1 * | 6/2003 | Moehnke et al. ............ 73/432.1 |
| 2005/0273184 | A1 | 12/2005 | Dauss et al. |
| 2007/0056369 | A1 | 3/2007 | Griffin et al. |
| 2008/0272923 | A1 | 11/2008 | Breed |
| 2011/0018703 | A1 | 1/2011 | Tracy et al. |
| 2013/0002443 | A1 | 1/2013 | Breed et al. |
| 2013/0275813 | A1 | 10/2013 | Loganathan et al. |

OTHER PUBLICATIONS

Web-based real-time temperature monitoring of shellfish catches using a wireless sensor network; Adaptive Sensors Group, National Centre for Sensor Research, School of Chemical Sciences, Dublin City University, Karl Crowley, June Frisby, Seamus Murphy, Mark Roantree, Dermot Diamond; http://www.sciencedirect.com/science/article/pii/S0924424705003419; 2005.

* cited by examiner

```
                        700
                       ↙
        ** Container 1 - ID, Num Lines
        A2-2, 1, 2
        ** Line 1:  Sys ID, Num Line Sensors
        QuasiStatic, 9
710 →   ** Channel, Index, Location (Stn, Face), Type, Model, SN, SN, Wavelength
        3, 1, 40, 90, 1, TRH, TRH_100T, TRH_100H, 1520.0
        3, 2, 41, 90, 2, TRH, TRH_100H, TRH_100T, 1525.0
        3, 3, 10,  0, 1, TRH, TRH_200T, TRH_200H, 1530.0
        3, 4, 11,  0, 1, TRH, TRH_200H, TRH_200T, 1535.0
        3, 5, 20,  0, 1, Temp, T_300, T_300, 1540.0
        3, 6, 30, 90, 1, Temp, T_400, T_400, 1543.0
        3, 7,  0, 90, 1, Temp, T_500, T_500, 1546.0
        3, 8, 10,  0, 9, Strain, S_100, S_100, 1550.0
        3, 9, 100, 0, 9, Strain, S_200, S_200, 1552.0
        ** Line 2:  Sys ID, Num Line Sensors
720 →   Vib Unit, 2
        ** Channel, Index, Location, Type, SN, Wavelength
        2, 1, F-X, 3, VibAccel, 100, 1550.0
        3, 1, A-X, 3, VibAccel, 200, 1550.0
        ** Line 3:  Sys ID, Num Line Sensors
730 →   Shock Unit, 6
        ** Channel, Index, Location, Type, SN, Wavelength
        1, 1, F-X, 4, ShockAccel, S1-1, 0.0
        1, 2, F-Y, 4, ShockAccel, S1-2, 0.0
        1, 3, F-Z, 4, ShockAccel, S1-3, 0.0
        2, 1, A-X, 4, ShockAccel, S2-1, 0.0
        2, 2, A-Y, 4, ShockAccel, S2-2, 0.0
        2, 3, A-Z, 4, ShockAccel, S2-3, 0.0
```

FIG. 24

REMOTE ENVIRONMENTAL AND CONDITION MONITORING SYSTEM

CROSS-REFERENCE TO RELATED APPLICATION

The present application claims priority to U.S. Provisional Patent Application Ser. No. 61/801,201, filed Mar. 15, 2013, the disclosure of which is expressly incorporated herein by reference.

STATEMENT REGARDING FEDERALLY SPONSORED RESEARCH OR DEVELOPMENT

The invention described herein includes contributions by one or more employees of the Department of the Navy made in performance of official duties and may be manufactured, used, licensed by or for the United States Government without payment of any royalties therein.

BACKGROUND OF THE DISCLOSURE

A need exists in the prior art for a system having the capability of monitoring environments associated with assets within a containment shell (i.e., container) that is both highly sensitive and highly reliable. Such a desired system would include the ability to continuously and autonomously measure the container environment for extended time periods. In addition, the desired system would illustratively include the ability to measure attributes of the asset. The desired system would also illustratively interpret and archive measured data and transfer the information to remote locations.

Because the containerized assets are expected to function properly after long-term dormant storage, the exemplary system should capture the actual environmental conditions that occur within the container. This is of particular interest with respect to sealed containers. These monitored environmental conditions may include temperature, humidity, vibration, and shock. The monitored environmental conditions are illustratively selected to address sensitivities of the containerized asset. For example, excess humidity can precipitate corrosion. The exemplary system may also monitor asset attributes, such as outgassing or elongation. Each exemplary container should be individually monitored since the conditions experienced by each container are unique. In some situations, the environment outside the container may also need to be monitored.

In certain illustrative embodiments, each container may be individually monitored to facilitate maintenance of individual container assets and/or the deactivation of a container and its asset due to exposure to environmental conditions outside of its predefined allowable ranges. Moreover, individual container monitoring could identify a variety of issues. For example, monitoring each individual container in a group could identify any existing thermal hot spots. In another example, individual container monitoring could identify locations where vibration levels generated by nearby equipment are potentially damaging to a container asset.

The exemplary system may further address deficiencies in certain existing systems such as inadequate data storage, insufficient data acquisition rates, and/or the introduction of electromagnetic (EM) or radio frequency (RF) radiation into the container. The exemplary system may have the ability to acquire environmental data, collected from a container that holds a highly sensitive and reactive asset, without introducing EM or RF radiation into the container. Such an exemplary system would not create EM interference and the system components, located inside the container, would not interfere with the highly sensitive and reactive asset.

Another consideration for a desired system is that highly precise devices, stored in containers for multiple years, should function properly without periodic maintenance. Such devices may include components whose calibration could be adversely impacted by environmental factors such as high temperature or shock impulses.

A desired system may also be preferably configured so that environmental conditions associated with each container are monitored continuously and the sensor readings archived. It may also be desired to use the archived data when making maintenance decisions and when estimating the remaining useful life of an asset. The archived data could support these functions by showing whether the asset experienced benign, moderate, or extreme environmental conditions or the data could be used in a prognostic model. Another useful aspect of a desired system may be that archived data can be provided to a vendor of the containerized asset to support warranty determinations.

In connection with sealed containers, environmental conditions (e.g., humidity and temperature) measured external to a container may not accurately represent internal conditions. For example, prior art maintenance methods have inferred degradation of an asset, stored within a container, based on the number of days the ambient temperature exceeds a threshold temperature. For situations where there is a substantial difference between internal and external conditions, this method may result in replacement of a still viable asset or the retention of a degraded asset.

SUMMARY OF THE DISCLOSURE

An exemplary embodiment of the present disclosure provides a unique monitoring system that can effectively track conditions within containers whose contents are sensitive to their environment. Accordingly, in one embodiment, the present disclosure provides for a plurality of containers with an environmentally sensitive asset within each container. In accordance with some forms of the disclosure, such a monitoring system is capable of acquiring and storing environmental conditions in multiple containers for periods of several years. Such a monitoring system may be used to effectively monitor environmental conditions within both sealed and unsealed containers which contain assets which may be sensitive to interaction by conventional sensors or monitoring systems.

An exemplary embodiment of the disclosure includes a plurality of different environmental and/or condition sensors. One embodiment may have the identical sensor suite or array inside each container. Another embodiment may have a variety of sensor suites in different containers. Exemplary sensors are configured to sense the container environment (i.e., environmental conditions). In one form of the disclosure, exemplary sensors are configured to sense an attribute of the asset (e.g., outgassing or elongation). Exemplary sensors may be unpowered, powered, or a combination thereof. Exemplary measurement units acquire sensor readings while a container is in service or in storage. The containers can be located in a variety of settings, such as open areas, enclosed areas, difficult to access areas, and/or hazardous areas.

In one illustrative embodiment, an asset may be sensitive to electromagnetic (EM) and/or radio frequency (RF) radiation. For this embodiment, the sensors would be unpowered so as not to emit EM radiation. Unpowered sensors may include fiber optic sensors of the Fiber Bragg Grating (FBG) or Fabry-Perot types. In another illustrative embodiment, an asset may not be sensitive to EM radiation so the sensors could be powered or be a combination of powered and unpowered. Examples of powered sensors are thermistors, capacitive humidity sensors, electrochemical gas sensors, and piezoelectric accelerometers.

One illustrative embodiment sensor array may monitor quasi-static environmental conditions, such as temperature and relative humidity. A second illustrative embodiment sensor array may monitor dynamic environmental conditions, such as vibration and shock. A third illustrative embodiment sensor array may monitor an asset attribute, such as outgassing and strain. Another illustrative embodiment sensor array may monitor a combination of quasi-static and dynamic environmental conditions and/or asset attributes.

An illustrative embodiment of the invention includes a computer program written in a commercial-off-the-shelf programming language. An exemplary computer program interfaces with the exemplary measurement units to obtain the sensor measurements in real time. Alternatively, the exemplary computer program may playback previously acquired measurements. An exemplary computer program performs the calculations necessary to convert the sensor measurements into an appropriate format. The exemplary computer program is configured to display the acquired data on a user interface.

An exemplary computer program may assign a status to the environmental or asset condition inside a container. It may assign a status based on preset acceptable levels defined by the asset owner. Measurements outside the preset levels may generate an alert, which indicates the asset is in a potentially damaging environment or potentially experienced damage. In one illustrative embodiment, the program may send an alert whenever a measured parameter crosses outside acceptable levels. In another illustrative embodiment, the program may send an alert when a series of measurements are outside of acceptable levels. The alerts allow a program operator, or asset expert, to decide whether an asset should remain in service. In addition, an alert may be used to initiate a problem investigation, for example, a high temperature may indicate a malfunctioning cooling system.

An exemplary computer program may archive the acquired environmental condition and asset measurement data. The data archive may contain the measurement time, measured level, and alert status. The program may archive all measurements or only measurements that meet a preset criteria. In one illustrative embodiment, the program retains measurements that exceed a preset threshold. In another illustrative embodiment, the program retains a preset number of measurements during a defined time period. In a third illustrative embodiment, the program may retain a pre-defined number of the most severe measurements. Alternatively, the program may use a combination of these retention criteria. The exemplary computer program could display the archived data on a user interface.

An exemplary graphical user interface (GUI) may generate an overview representation of a group of containers. An operator of an exemplary system may oversee multiple groups of containers. The GUI may denote container status with a color scheme or a distinctive border. For example, when all exemplary measured parameters, associated with an exemplary container, are within preset acceptable levels, a status indicator may be green. To the contrary, when a measured parameter is outside preset acceptable levels, a status indicator may be red.

An exemplary GUI may be designed to display all the latest measured parameters associated with a single container. In this case, an operator selects the container of interest, via the GUI. This single container display illustratively includes a digital display and a status indicator for each sensor. The digital display gives the sensor location and measured environmental condition, while the status indicator denotes whether the measured environmental condition is within the allowable range.

An exemplary GUI may also be designed to display a recent history of measurements associated with a single container. In this case, an operator selects the desired measured parameter, using the GUI. This display illustratively shows the current measurement and status plus charts of the measurements collected over the previous day. An exemplary GUI can also be designed to display measurements archived over a longer ("Historic") timeframe. The "Historic" display contains a chart of archived measurement data along with the preset acceptable levels and a table of measurement statistics.

The exemplary monitoring system may interface with Local Access Networks (LANs) to support data transfer to or from remote locations. In another illustrative embodiment, the measured parameters may be forwarded to organizations that oversee or manage the assets. These organizations could use the data to assist in making maintenance and replacement decisions, setting design parameters, and/or performing root cause failure analysis.

An illustrative embodiment of the invention also includes a self-health monitoring subsystem. This feature may be independent from the monitored containers and the measurement units associated with them. This exemplary subsystem may acquire and report on diagnostics of the exemplary system's hardware and computers. The diagnostics may be chosen to indicate the operational status of the measurement units and communication interfaces in addition to acquiring other parameters, such as equipment and computer temperatures. An exemplary GUI may be configured to display these diagnostics. Also, the exemplary subsystem may maintain a diagnostics log. An operator may use the GUI display and log to troubleshoot anomalies in the overall exemplary monitoring system.

According to an illustrative embodiment of the disclosure, a maintenance system includes a plurality of containers, each of the containers being sealed and receiving a payload, each payload being sensitive to environmental conditions. A plurality of sensors are received within each of the containers, wherein the sensors are configured to detect temperature and humidity within the container, and the sensors are further configured to detect vibration and shock on the container. A logging device is in communication with the sensors and is configured to receive readings of detected temperature, humidity, vibration and shock from the sensors. The logging device is further configured to store a plurality of successive readings of detected temperature, humidity, vibration and shock from the sensors for multiple years. The logging device interfaces with the sensors from each of the containers. The logging device is configured to output the readings of detected temperature, humidity, vibration and shock from the sensors to a computer program. The computer program is configured to compare the readings with known allowable levels for the payload in the container and to produce a result that indicates the likelihood of payload damage on a real time basis. The computer program is further configured to display the status indicator of the payloads in all of the containers, and a payload operator may determine which payload to utilize based upon the status indicator of the payloads.

According to another illustrative embodiment of the present disclosure, an environmental and condition monitoring system includes a plurality of containers, each container receiving an asset sensitive to the environment. First and second sensors are operably coupled to the container. The first sensors detect quasi-static environments in the container, and the second sensors detect dynamic environments on the container. Measurement devices interface with the first and second sensors from the plurality of containers. A central computer includes a computer program and a memory, wherein the measurement device reports sensor readings to the computer program. The computer program is configured to compare the measurements with preset acceptable levels for the asset in the container and produce a result indicating the measurement status on a real time basis. The computer program is configured to display the status of all of the containers. The memory of the computer stores the measurements for a plurality of years. The computer program is further configured to show the historical data of the readings for each container. A user interface is in communication with the central computer, wherein an operator may access the real time status of all the containers and the historical data for each container.

A method according to an illustrative embodiment of the present disclosure includes the steps of detecting environmental conditions within a container through a plurality of sensors, acquiring the detected quasi-static environmental conditions by a quasi-static measurement unit, detecting dynamic environmental conditions of the container through a plurality of sensors, and acquiring the detected dynamic environmental conditions of the container by a dynamic measurement unit. The method further includes the steps of reporting measurement readings from the quasi-static measurement unit and the dynamic measurement unit to a central computer, and comparing the measurement readings with preset acceptable levels for an asset within each container. The method further includes the steps of producing a result indicating measurement status on a real time basis, displaying the measurement status for each of the containers, storing the detected measurement readings for each container for multiple years, and displaying historical data of the measurement readings for each container for multiple years.

According to a further illustrative embodiment of the present disclosure, a containment system includes a plurality of containers arranged in a group, each container having an outer shell defining a chamber to receive an asset, and a lid operably coupled to the outer shell and configured to cover the chamber. A sensor array is associated with each of the plurality of containers. Each sensor array includes first sensors to detect quasi-static environmental conditions in the container, the first sensors being received within the chamber of the container, and second sensors to detect dynamic environmental conditions on the container, the second sensors being operably coupled to the outer shell and longitudinally spaced along the container. A controller is in communication with the sensor array. The controller includes measurement devices and a central computer having a memory. The first and second sensors provide signals to the measurement devices, the measurement devices provide measurement readings to the central computer based upon the signals from the first and second sensors. A user interface includes a display in communication with the controller. The memory includes preset acceptable measurement levels, wherein the computer is configured to compare the measurement readings with the preset acceptable measurement levels for the asset in the container. The display is configured to provide a graphical representation of the plurality of containers, each container representation including an indicator representative of the measurement status on a real time basis.

According to another illustrative embodiment of the present disclosure, an environmental and condition monitoring system includes a sensor array associated with each of a plurality of containers. The sensor array includes first sensors to detect quasi-static environmental conditions in the container, and second sensors to detect dynamic environmental conditions on the container. A controller is in communication with the sensors. The controller includes measurement devices and a central computer having a memory. The first and second sensors provide signals to the measurement devices. The measurement devices provide measurement readings to the central computer based upon the signals from the first and second sensors. A user interface includes a display in communication with the controller. The memory includes preset acceptable measurement levels associated with an asset in the container. The computer program is configured to compare the measurement readings with the preset acceptable levels for the asset in the container. The controller is configured to provide on the display an overview graphical representation of the plurality of containers. The overview graphical representation includes an indicator representative of the measurement status of each container on a real time basis. The controller is further configured to provide on the display a detailed graphical representation of an individual container, the detailed container graphical representation including status indicators for each sensor associated with the container and detailed measurement readings on a real time basis.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

Reference will not be made to the attached drawings, when read in combination with the following detailed description, wherein like reference numerals refer to like part throughout the several views, and in which:

FIG. 24 is an illustrative method to define the instrumentation in a single container of the illustrative environmental and condition monitoring system of FIG. 2.

DETAILED DESCRIPTION OF THE DRAWINGS

The invention and the various features and advantageous details thereof are explained more fully with reference to the nonlimiting embodiments that are illustrated in the accompanying drawings and detailed in the following description. It should be understood that the detailed description and the specific examples, while indicating specific embodiments of the invention, are given by way of illustration only and not by way of limitation. Various substitutions, modifications, additions and/or rearrangements within the spirit and/or scope of the underlying inventive concept will become apparent to those of ordinary skill in the art from this disclosure.

Figure 1:
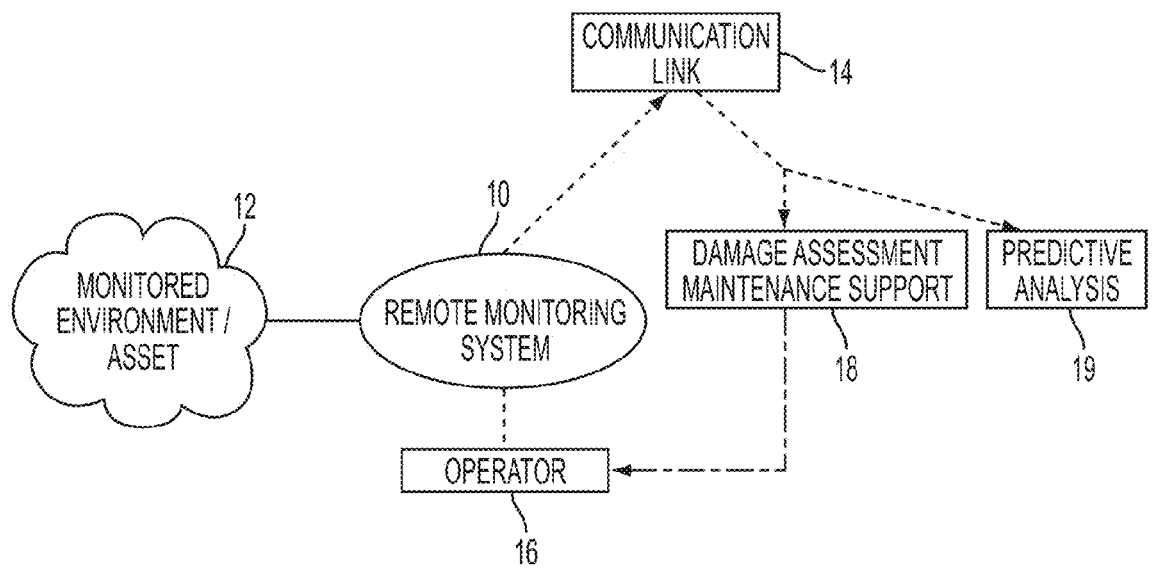
FIG. 1 is a diagrammatic view of an illustrative environmental and condition monitoring system of the present disclosure for interaction with remote operating systems.

FIG. 1 is a block diagram of an illustrative environmental and condition monitoring system 10 configured to monitor the environment inside and/or outside a container 12 and the condition of an asset or payload 22 within the container 12.

The illustrative environmental and condition monitoring system 10 may be utilized as an asset maintenance system. Such assets 22 may include a wide variety of items, such as electronics, pharmaceuticals, chemicals, etc., that may be sensitive to certain environmental conditions (e.g., temperature, humidity, vibration, and/or shock).

The monitored container 12 and/or asset 22 may be located near or remote from the monitoring system 10. In the illustrative embodiment, the remote monitoring system 10 communicates through a communication link 14 with other support areas such as damage assessment and maintenance support 18, and asset subject matter experts that engage in predictive life analysis 19. The monitoring system 10 may provide both near real time and historical (archived) environmental and asset condition measurement data (e.g., temperature, humidity, vibration, shock, strain, etc.). In certain instances this information may be used to make warranty determinations on the asset 22 (i.e., to ensure that the asset 22 has not been exposed to potential warranty invalidating events). Also in the illustrative embodiment, the monitoring system 10 may function autonomously and operator 16 intervention is limited to implementing any corrective actions ordered by damage assessment and maintenance support 18.

Figure 2:
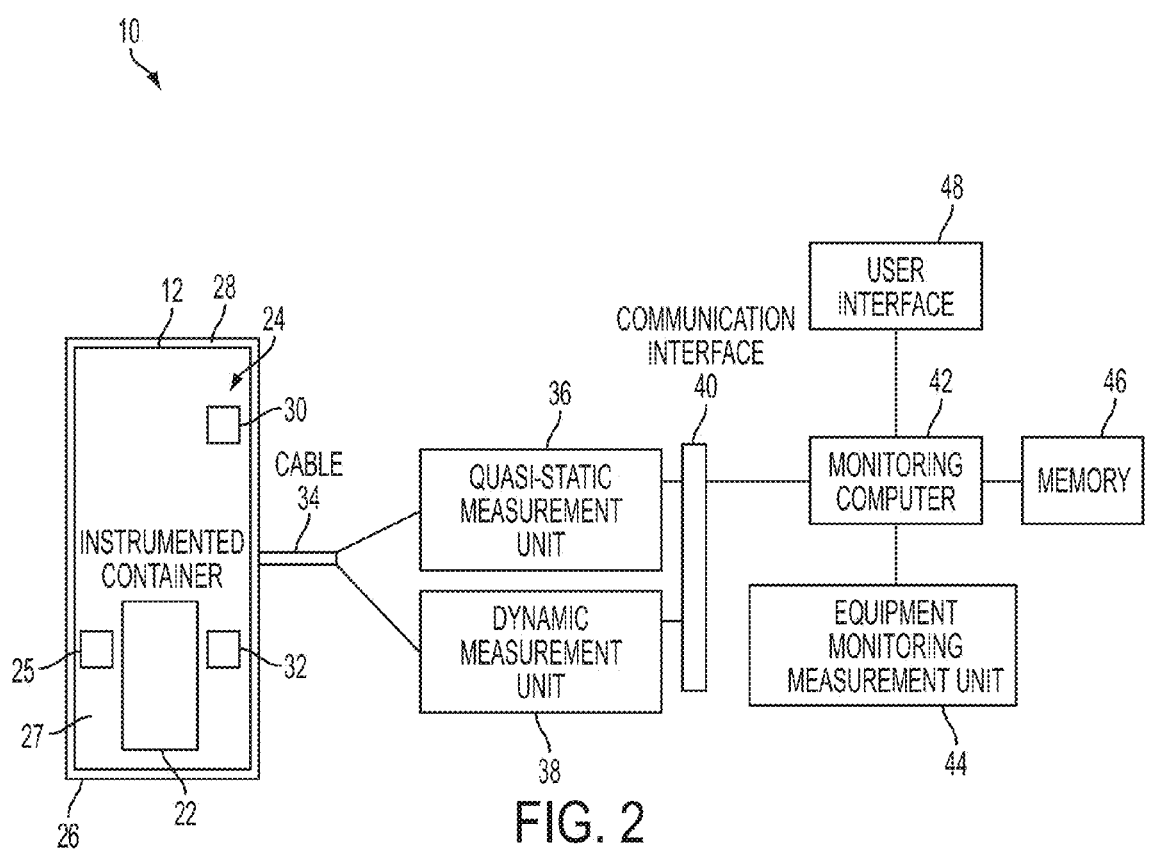
FIG. 2 is a block diagram of an illustrative environmental and condition monitoring system associated with an exemplary container.

FIG. 2 is a block diagram of the main components of an exemplary monitoring system 10. A sensor suite 24 is associated with each illustrative container 12. Each container 12 includes a shell or wall 26 defining a chamber 27 configured to receive the asset 22. A lid or cover 28 is operably coupled to the shell 26 and covers the chamber 27. In certain illustrative embodiments, the lid 28 seals the chamber 27 from the external environment (i.e., atmosphere).

An exemplary instrumented container 12 receives asset 22 and is operably coupled to the sensor suite 24. The sensor suite 24 may be configured to measure a combination of the internal environmental conditions within the chamber 27 of container 12, and/or attributes or conditions of the asset 22. For example, the types, quantity and location of sensors may vary based upon the anticipated environment and asset requirements. The sensor suite 24 may include a first (or quasi-static environmental condition) sensor suite including a plurality (illustratively in a series or line) of first environmental condition sensors 30 configured to detect quasi-static environmental conditions, such as temperature and humidity. The sensor suite 24 may also include a second (or dynamic environmental condition) sensor suite including a plurality (illustratively in a series or line) of second environmental condition sensors 32 configured to detect dynamic environmental conditions, such as vibration and shock. The sensor suite 24 may also include a third (or asset condition) sensor suite including a plurality of asset condition sensors 25 (illustratively in a series or line), each configured to detect a condition or attribute of the asset 22, such as elongation, outgassing, leakage, and/or tampering.

The exemplary instrumented container 12 is connected to exemplary measurement units (or logging devices) 36 and 38 for quasi-static measurements, such as temperature and humidity, and dynamic measurements, such as vibration and shock. A cable 34 illustratively connects the measurement units 36 and 38 and the sensor suite 24 of the instrumented container 12. The exemplary monitoring system 10 may include any number of different types of exemplary measurement units 36 and 38.

Exemplary measurement units 36 and 38 communicate with an exemplary monitoring computer 42 via a communication interface 40. The communication interface 40 may be Ethernet. An exemplary equipment monitoring measurement unit 44 acquires diagnostic parameters of the exemplary measurement units 36 and 38 and monitoring computer 42, and reports these parameters to the exemplary monitoring computer 42. These diagnostic parameters may include temperature and humidity (i.e., moisture) in the environment associated with this equipment (e.g., measurement units 36 and 38, and monitoring computer 42). The computer 42 is in communication with a memory 46 and a user interface 48. The user interface 48 may be a multicolor monitor or display cooperating with an operator input device, such as a mouse and/or keyboard, for providing graphical user interfaces, as further detailed herein.

The quasi-static measurement unit 36 may comprise a Micron Optics sm125 optical sensing interrogator configured to provide measurements of optical sensors, in real time, at programmed time intervals. It should be noted that other measurement units 36 may also be used with sensors 30. The monitoring computer 42 is configured to interface with any data acquisition unit (optical or non-optical) that outputs measurements in a delimited format.

Figure 3:
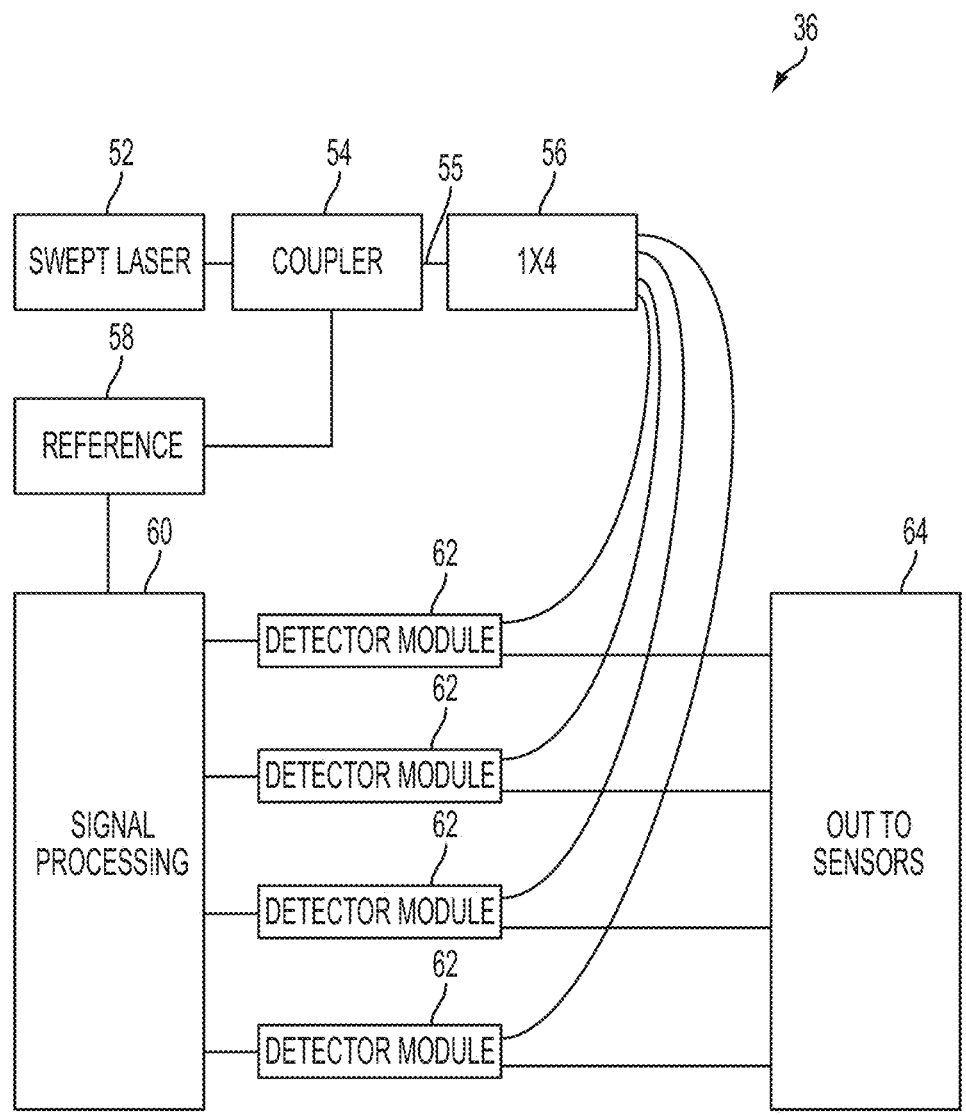
FIG. 3 is a diagrammatic view of an illustrative optical sensing interrogator for use as a quasi-static measurement unit of the illustrative environmental and condition monitoring system of FIG. 2.

FIG. 3 is a diagrammatic view of an illustrative optical sensing interrogator 36. The interrogator 36 includes a light source, illustratively a swept-wavelength laser 52. Exemplary coupler 54 splits the output from the laser 52 between a reference 58 and sensor arrays 55. Exemplary 1×4 splitter 56 splits the output among a plurality of sensor branches. Each branch may be coupled to multiple sensors (for example sensors 30) through an interface 64. Light reflected by the sensors 30 returns to the exemplary detector module 62 and is processed by the exemplary signal processor 60.

The dynamic measurement unit 38 is configured to interrogate sensors 32 and provide measurements, in real time, at programmed time intervals and/or when a measurement exceeds a preset criterion. The dynamic measurement unit 38 may comprise a FiberSensing FS5600 Braggscope for use with optical accelerometers to measure vibration and shock. It should be noted that other measurement units 38 may also be used with sensors 32.

In an alternative illustrative embodiment, the monitoring system 10 uses two dynamic measurement units 38, one for vibration and one for shock. The unit with the lower magnitude and frequency range collects vibration, and the unit with the higher magnitude and frequency range collects shock. In this embodiment, the second unit may comprise a National Instruments (NI) 9234 dynamic signal acquisition module. The Braggscope and optical accelerometers measure vibration, while the NI module and piezoelectric (IEPE) accelerometers measure shock.

Figure 4:
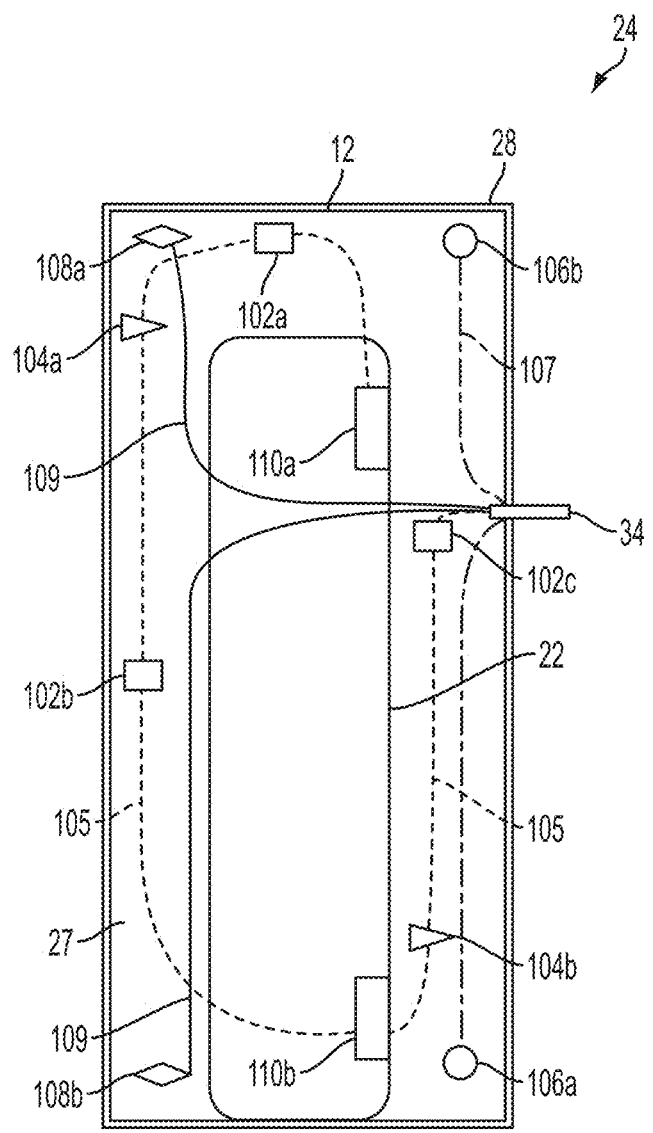
FIG. 4 is a side view, in partial schematic, of an asset inside a container showing an illustrative sensor suite of the illustrative environmental and condition monitoring system of FIG. 2.

FIG. 4 shows an illustrative layout of exemplary sensors 30, 32 and 25 of sensor suite 24 within container 12. Sensor readings are used to characterize the exemplary container 12 environment and asset 22 physical state. In the illustrative sensor suite 24, the first environmental condition sensors 30 include temperature sensors 102 and humidity sensors 104, while the second environmental condition sensors 32 include vibration sensors 106 and shock sensors 108. The asset condition sensors 25 illustratively include strain sensors 110. As further detailed herein, other environmental condition sensors 30 and 32 (e.g., moisture sensors) and asset condition sensors 25 (e.g., pressure sensors, chemical sensors, liquid presence sensors, tamper event sensors, temperature sensors, or accelerometers) may be used in connection with the monitoring system 10.

In the illustrative embodiment of FIG. 4, three (3) temperature sensors 102*a*, 102*b*, and 102*c* are positioned at strategically spaced locations within the chamber of container 12. More particularly, the sensors 102*a*, 102*b*, and 102*c* are positioned to provide representative temperature measurement readings at different locations within the chamber 27 at positions important relative to the asset 22. The active parts of temperature sensors 102 may be mounted in direct contact with the container shell 26 to measure the temperature of the shell 26. Alternatively, packaged sensors 102 may be mounted directly on the shell 26 to measure the air layer next to the shell 26. In another embodiment, the sensors 102 may be mounted to a standoff (not shown) secured to the container shell 26 for measuring air temperature within the chamber 27 of the container 12. It should be appreciated that the number and location of temperature sensors 102 may vary depending upon need, such as the details of the particular container 12 and asset 22. Each temperature sensor 102 may be of conventional design, such as a thermistor, thermocouple, or any other suitable temperature sensor. In illustrative embodiments where the asset 22 may be sensitive to electromagnetic (EM) radiation or emissions, such as radio frequency (RF) emissions, unpowered sensors may be utilized, such as optical sensors. In one illustrative embodiment, the temperature sensors 102 may be Fiber Bragg Gratings (FBG) type optical sensors.

Also as shown in the illustrative embodiment of FIG. 4, two (2) humidity sensors 104 are positioned at strategically spaced apart locations within the chamber 27 of container 12. More particularly, the humidity sensors 104*a* and 104*b* are positioned to provide representative humidity measurement readings at different locations within the chamber 27 at positions important relative to the asset 22. The humidity sensors 104 may be mounted on a standoff (not shown) secured to the container shell 26 for measuring air humidity within the chamber 27. Each humidity sensor 104 may be of conventional design. In illustrative embodiments where the asset 22 may be sensitive to electromagnetic (EM) radiation or emissions, such as radio frequency (RF) emissions, unpowered sensors may be utilized, such as optical sensors. In one illustrative embodiment, the humidity sensors 104 may be optical sensors, such as those based on Fiber Bragg Gratings (FBG).

With further reference to the illustrative embodiment of FIG. 4, two (2) vibration sensors (e.g., accelerometers) 106 are positioned at strategically spaced apart locations within the chamber 27 of container 12. More particularly, the accelerometers 106*a* and 106*b* are positioned to provide representative vibration readings at different locations within the chamber 27 at positions important relative to the asset 22. The accelerometers 106 are illustratively attached directly to the container shell 26. In alternative embodiments, the accelerometers 106 may be secured to inner or outer surfaces of the container shell 26. In illustrative embodiments where the asset 22 is not sensitive to electromagnetic (EM) or radio frequency (RF) radiation or emissions, accelerometers 106 may be of piezoelectric, integrated electronic piezoelectric (IEPE), piezoresistive, or MEMS (Micro Electro-Mechanical Systems) design. In illustrative embodiments where the asset 22 may be sensitive to electromagnetic (EM) radiation or emissions, such as radio frequency (RF) emissions, unpowered sensors may be utilized, such as optical sensors. In one illustrative embodiment, the vibration sensors 106 may be optical, with a range of 100 g, 300 Hz, of the type available from Micron Optics of Atlanta, Ga.

As also shown in the illustrative embodiment of FIG. 4, two (2) shock sensors (e.g., accelerometers) 108 are positioned at strategically spaced apart locations within the chamber of container 12. More particularly, the shock sensors 108*a* and 108*b* are positioned to provide representative shock readings at different locations within the chamber 27 at positions important relative to the asset 22. The accelerometers 108 are illustratively attached directly to the container shell 26. In illustrative embodiments where the asset 22 is not sensitive to electromagnetic (EM) or radio frequency (RF) radiation or emissions, accelerometers 108 may be of piezoelectric, integrated electronic piezoelectric (IEPE), piezoresistive, or MEMS (Micro Electro-Mechanical Systems) design. In illustrative embodiments where the asset 22 may be sensitive to electromagnetic (EM) radiation or emissions, such as radio frequency (RF) emissions, unpowered sensors may be utilized, such as optical sensors. In one illustrative embodiment, the accelerometers 108 may be of the tri-axial integrated electronic piezoelectric (IEPE) type available from Kistler of Amherst, N.Y.

In the illustrative embodiment of FIG. 4, asset condition sensors 25 may include strain sensors 110 attached to an external surface of asset 22. The strain sensors 110a and 110b are positioned at strategically spaced apart locations on the external surface of asset 22. Each strain sensor 110 may be of conventional design and illustratively comprises a strain gage directly attached to the external surface of the asset 22. In illustrative embodiments where the asset 22 may be sensitive to electromagnetic (EM) radiation or emissions, such as radio frequency (RF) emissions, unpowered sensors may be utilized, such as optical strain gages based on Fiber Bragg Gratings (FBG).

As noted above, other types of asset condition sensors 25 may include pressure sensors, chemical sensors, liquid presence sensors, tamper event sensors, radiation sensors, electromagnetic (EM) field sensors, temperature sensors, or accelerometers. Such asset condition sensors 25 may attach to the asset 22 or to the container 12, depending upon the sensor type. For example, pressure sensors may be used to detect outgassing of the asset 22, and may be attached to the asset 22 or mounted on a standoff attached to the container shell 26. Similarly, chemical (or other contamination) sensors may be used to detect changes in condition of the asset 22, and may be attached to the asset 22 or mounted on a standoff attached to the container shell 26. Liquid presence sensors may be used to detect the presence of liquid within the chamber 27 resulting, for example, from leakage from the asset 22. Such liquid presence sensors may be mounted to the asset 22 or to the container 12 at a low point where liquid would tend to collect. Tamper event sensors could include switches configured to detect unauthorized access to the asset 22. Radiation and electromagnetic field sensors may be attached directly to the asset or to the container shell 26. Temperature sensors may be attached to the asset 22 in a manner similar to temperature sensors 102 (e.g., to measure the skin, adjacent air layer, or air temperature). Accelerometers may be attached directly to the asset 22.

An exemplary sensor cable 105 connects exemplary temperature sensors 102, humidity sensors 104, and strain sensors 110 in series to external cable 34. Exemplary cable 107 connects vibration sensors 106, and illustrative cable 109 connects shock sensors 108 to the external cable 34. If the container 12 is sealed, a sealing gasket (not shown) may extend between external cable 34 and container shell 26.

The sensor type(s) determine the specific cable type(s) operably coupled thereto. For example, optical sensors would illustratively use a fiber optic line, such as a standard 1550 nm telecommunications line, piezoelectric sensors would illustratively use a coaxial cable, and resistive sensors would illustratively use a multi-conductor cable.

Figure 5:
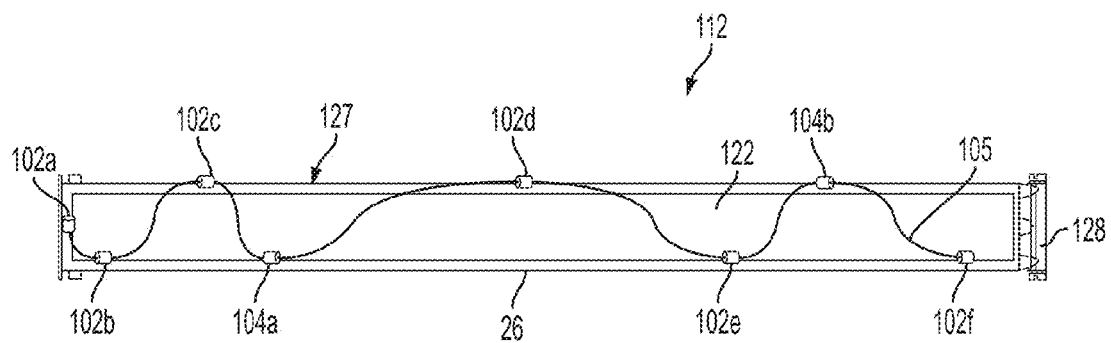
FIG. 5 is a side view, in partial schematic, of a container showing an illustrative quasi-static environmental condition instrumentation of an illustrative sensor suite.

FIG. 5 is an illustrative layout of first environmental condition sensors 30 of an exemplary optical sensor suite 24 configured to detect quasi-static environmental conditions in an exemplary container 112 sealed by a lid 128 and receiving an asset or payload 122. More particularly, temperature sensors 102 and humidity sensors 104 are positioned within sealed container 112 for detecting temperature and relative humidity in a chamber 127 receiving asset 122. Exemplary optical fiber 105 is strung throughout exemplary sealed container 112 and couples the sensors 102 and 104 in series to measurement unit 36. Temperature readings are illustratively taken at six (6) spaced apart locations by temperature sensors 102a, 102b, 102c, 102d, 102e, and 102f. Humidity readings are illustratively taken at two (2) spaced apart locations by humidity sensors 104a and 104b. As shown in FIG. 5, the sensors 102 and 104 are positioned at different locations within the chamber 127 of container 112 to provide measurement readings at different locations relative to asset 122. These readings are supplied to the quasi-static measurement unit 36 and monitoring computer 42 to calculate temperature and relative humidity in container 112.

Figure 6:
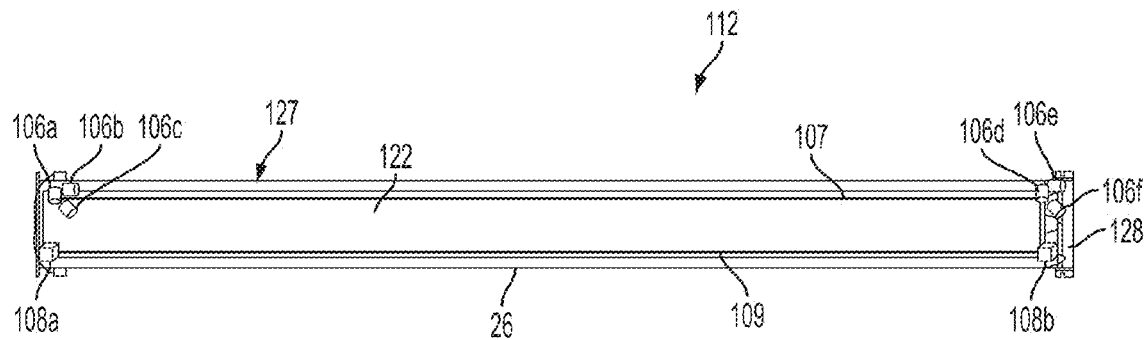
FIG. 6 is a side view, in partial schematic, of a container showing an illustrative dynamic environmental condition instrumentation of an illustrative sensor suite.

FIG. 6 shows exemplary layout of second environmental condition sensors 32 of an exemplary optical sensor suite 24 configured to detect dynamic environmental conditions. More particularly, vibration sensors 106 and shock sensors 108 detect vibration and shock, respectively, of sealed container 112. Optical fiber cable 107 is illustratively laid out throughout exemplary sealed container 112 and couples the sensors 106 in series to measurement unit 38. In the illustrative embodiment, six (6) fiber optic accelerometers 106 are attached to optical fiber cable 107, wherein three forward accelerometers 106a, 106b, 106c (illustratively to detect acceleration in z, x, and y directions) are placed at one end of exemplary container 112, and three rearward or aft accelerometers 106d, 106e, 106f (illustratively to detect acceleration in z, x, and y directions) are placed at the opposing end of the container 112. Sensor line or cable 109 is strung along exemplary sealed container 112, wherein forward and rearward (aft) tri-axial IEPE accelerometers 108a and 108b (illustratively to detect acceleration in z, x, and y directions) are coupled in series to measurement unit 38 by the cable 109 at opposing ends of the container 112. Measurement readings are supplied to the dynamic measurement unit 38 and monitoring computer 42 to calculate vibration and shock affecting the container 112 and asset 122.

While FIGS. 5 and 6 illustrate representative layouts of sensors 30 and 32 of an exemplary optical sensor suite 24, different sensor suites 24 may be tailored for various assets 122 and containers 112. For example, different combinations, quantities and locations of temperature 102, humidity 104, vibration 106 and shock sensors 108 may be utilized based upon the type of asset 112 and anticipated environmental conditions of container 112. The sensors 30 and 32 are positioned at strategic locations to obtain effective environmental condition measurements in relation to the asset 122, while not interfering with access to, and egress of, the asset 122.

Figure 7:
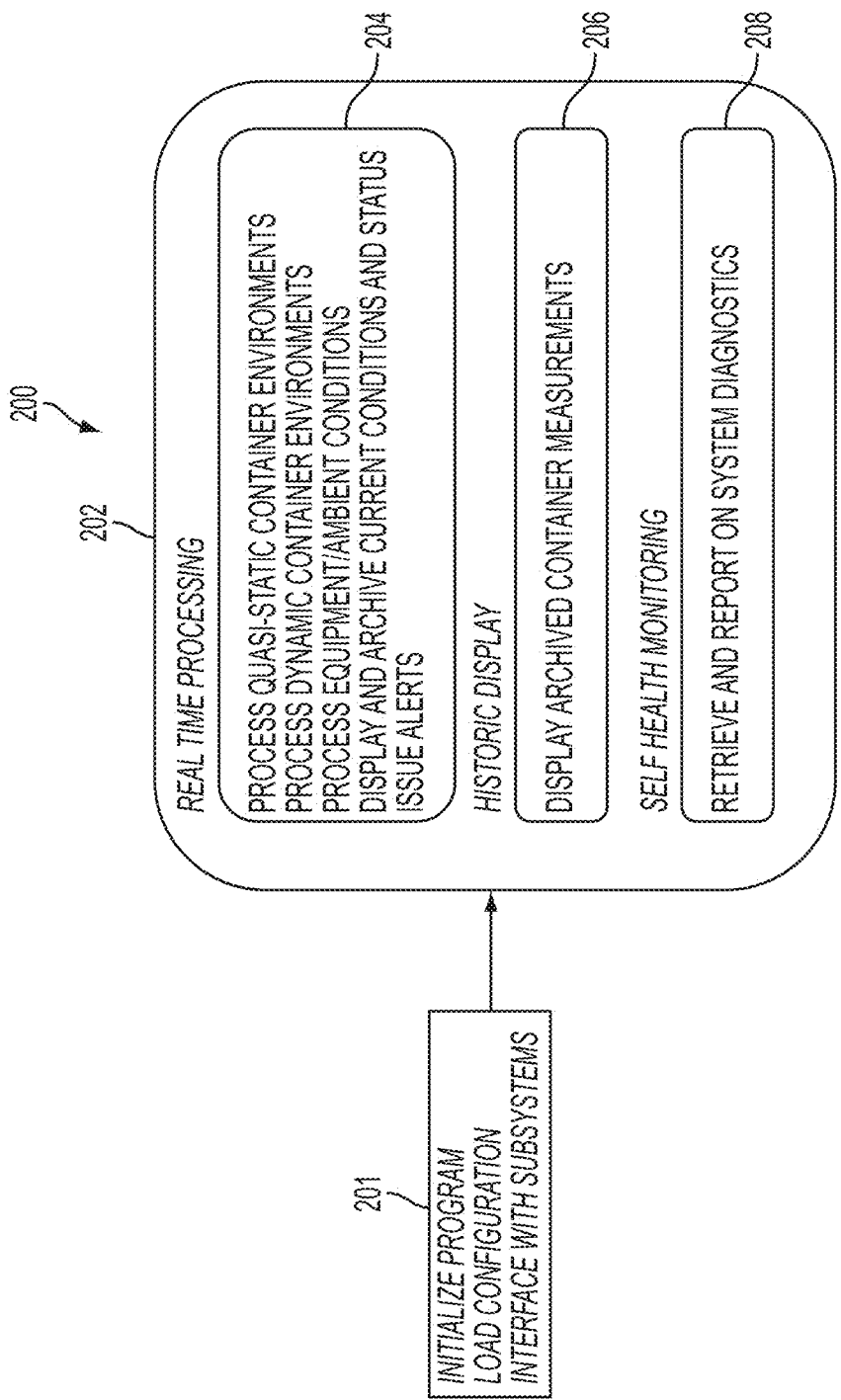
FIG. 7 is a block diagram of an exemplary structure of an illustrative computer program that acquires, interprets, and reports on exemplary data from an illustrative sensor suite.

FIG. 7 is an overview structure of an exemplary computer program 200 for the illustrative environmental and condition monitoring system 10 of the present disclosure. The computer program 200 is a family of real time programs illustratively written in a commercial-off-the-shelf programming language, such as LabView 8.6.1 visual programming language. The computer program 200 may be executed by the central monitoring computer 42. As further detailed herein, the computer program 200 automatically starts when the computer 42 is powered on or upon operator command. The computer program 200 also reads, processes, displays, and archives environmental measurements from all connected sensors 30, 32 and 25, and generates warning messages when measurements are outside of predefined acceptable ranges. The computer program 200 also displays archived (historic) data, and performs self-health monitoring and assessment.

In this illustrative embodiment, the computer program 200 starts automatically when the computer 42 is powered-up. Alternatively, the computer program 202 may start at a scheduled time or at an operator's command. During startup at block 201, the exemplary computer program 200 initializes data structures, loads the instrumentation configuration and other run parameters from a configuration definition, and establishes communication with the subsystems, including measurement units 36, 38 and 44. The exemplary computer program 200 chronicles the initialization process in a startup log which may be stored in memory 46.

After startup, the exemplary computer program 200 includes main functions or processing modules at block 202. These main functions include a real time processing module 204, historic display module 206, and self health monitoring module 208. The exemplary real time processing 204 acquires, processes, archives, reports on, and displays the sensor data collected by the exemplary measurement units 36 and 38. The exemplary computer program 200 periodically checks for new data from the measurement units 36 and 38, and the computer program 200 retrieves the data in chronologic order.

The measurement units 36 and 38 sample the sensors 30 and 32 of sensor suite 24 at a preset rate that is appropriate for the type of data being collected. In one illustrative embodiment, the quasi-static measurement unit 36 may acquire temperature and humidity readings at 1 Hz and output readings at 15 minute intervals. In another embodiment, the dynamic measurement unit 38 may acquire measurements at 5000 Hz and output a 1-second waveform both at a preset interval (e.g. 15 minutes) and whenever the magnitude exceeds a predetermined threshold. In one illustrative embodiment, the system 10 may include two dynamic measurement units 38, one for shock and one for vibration. In this embodiment, the shock unit may acquire measurements at 5000 Hz and record a 1-second waveform whenever the detected magnitude exceeds a predetermined threshold, while the vibration unit may acquire measurements at 2000 Hz and record a 1-second waveform every hour.

As further detailed herein, the exemplary computer program 200 generates alerts when the exemplary environmental conditions are outside of preset allowable levels which are stored in memory 46. More particularly, the alerts may be visual and/or audible indicators provided by the user interface 48. For example, the user interface 48 includes a display or monitor to provide a visual indicator and/or a speaker to provide an audible indicator.

The exemplary historic display module 206 produces graphs and statistics of operator-selected archived datasets. These datasets are readings from measurement units 36 and 38 acquired over extended time periods (typically for multiple years) and stored in memory 46. As such, the stored dataset includes both quasi-static measurement readings from sensors 30, and dynamic measurement readings from sensors 32. The stored datasets may also include asset condition measurement readings from sensors 25.

The third main function of exemplary computer program 200 is the self health monitoring module 208. This module 208 acquires, tracks, and reports on diagnostics for the entire illustrative environmental and condition monitoring system 10. These diagnostics are indicators of the current operational status and ability of the system 10 to operate reliably. The diagnostics may include, but are not limited to, the operational status of the measurement units 36 and 38, sensors 25, 30 and 32, available disk space in memory 46, and power levels. The diagnostics may further include temperature and humidity (i.e., moisture) in the environment associated with this equipment (measurement units 36 and 38, and monitoring computer 42). As noted above, exemplary equipment monitoring measurement unit 44 acquires diagnostic parameters of the exemplary measurement units 36 and 38 and monitoring computer 42, and reports these parameters to the exemplary monitoring computer 42.

Figure 8:
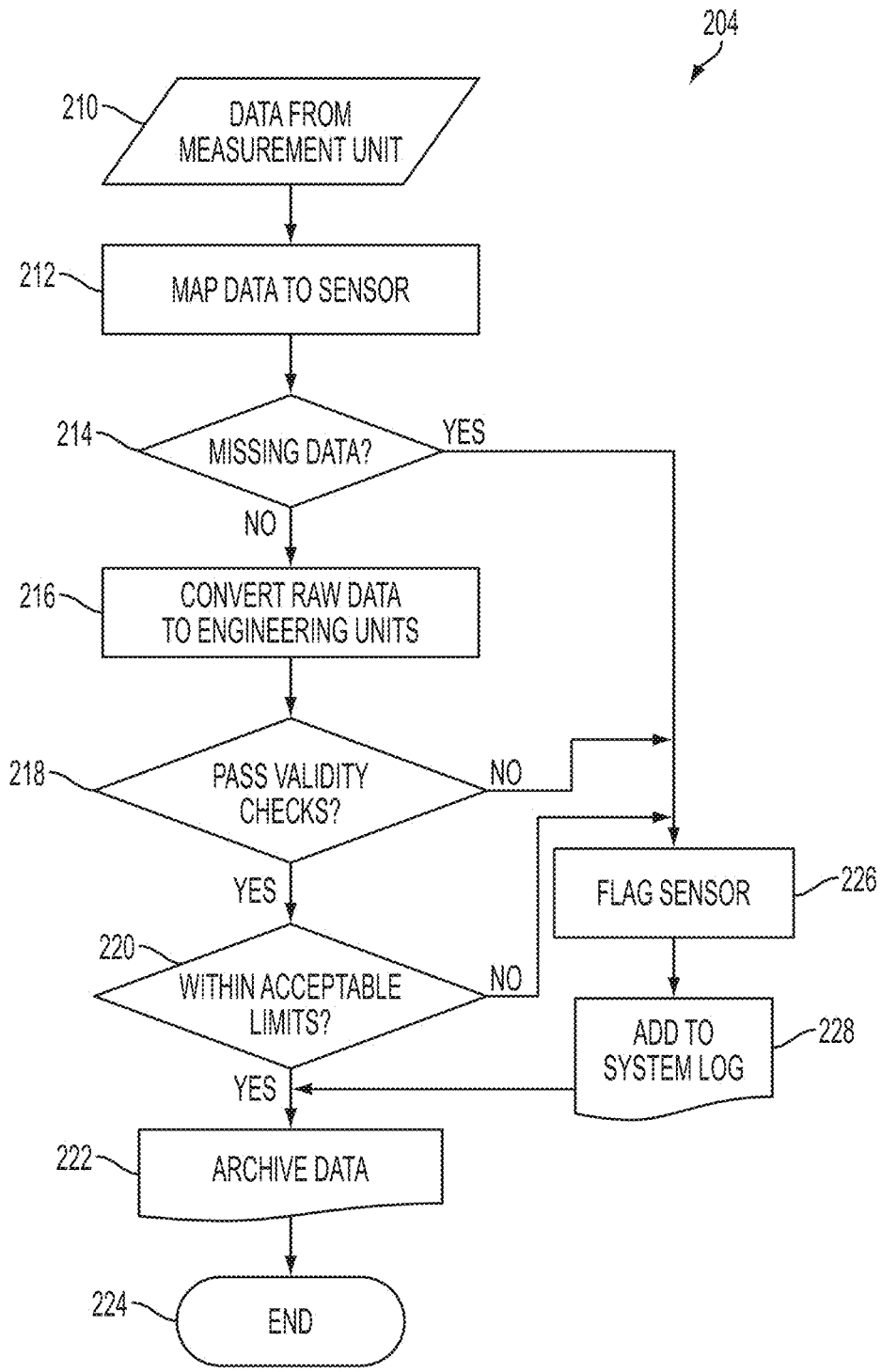
FIG. 8 is a flow chart of a method of operation of an illustrative computer program module that processes and interprets exemplary sensor data.

FIG. 8 is an operational overview of the measurement real time processing module 204, performed by the exemplary computer program 200, in one illustrative embodiment of the present disclosure. The measurement real time processing module 204 is tailored to the measurement type, such as quasi-static environmental conditions (e.g., temperature and/or humidity) and dynamic environmental conditions (e.g., vibration and/or shock). At block 210, the exemplary processing module 204 receives data (i.e., measurement readings) from respective measurement units 36 and 38. The data is mapped to the respective sensors 102, 104, 106, 108 at block 212. The data may be in instrument or engineering units. At block 214, the module 204 determines if any data is missing. If so, the missing data is flagged by the computer 42 at block 226, and added to a system log stored in memory 46 at block 228. Each log entry includes the date, time, sensor identifier, measurement reading, and a description of the issue.

Next, if needed, the raw instrument readings from measurement units 36 and 38 are converted to engineering units at block 216. The conversion method may be a single calibration factor, polynomial or other expression, or through a lookup table stored in memory 46. Next, each measurement undergoes a validity check at block 218. Measurements that fail the check are flagged at block 226, and added to the system log stored in memory 46 at block 228. The details of the validity checks are tailored to the measured parameter. For example, new temperature and humidity measurements are compared to those from the previous sample interval. Sensor measurements that change by more than a preset level (e.g., 50° F.) are considered suspect and may be invalid. Shock and vibration validity checks look at the entire waveform. Waveforms that contain excessive noise or demonstrate drifts or signal saturation are considered invalid. Also, all measurements outside a sensor's specified range are considered invalid.

After passing the validity check at block 218, the process continues at block 220, where the module 204 flags measurements that are outside of preset allowable limits at block 226. At block 228, flagged measurements are stored in the system log within memory 46. As noted above, each log entry includes the date, time, sensor identity, measurement level, and a description of the issue.

At block 222, the exemplary processing module 204 adds the measurement to a data archive stored in memory 46. The exemplary data archive contains the time, measured parameter, error indicator (missing or invalid), and allowable limits indicator. The exemplary processing module 204 may archive and retain all measurements, or alternatively, it can retain measurements that meet defined criteria. One retention criterion is to archive measurements that exceed a preset threshold. A second option is to archive a pre-defined number of measurements over a pre-defined time period. Another option is to archive a pre-defined number of the most severe measurements. The exemplary data archive is illustratively stored in a commercial spreadsheet compatible format. Operation of the processing module 204 ends at block 224.

Figure 9:
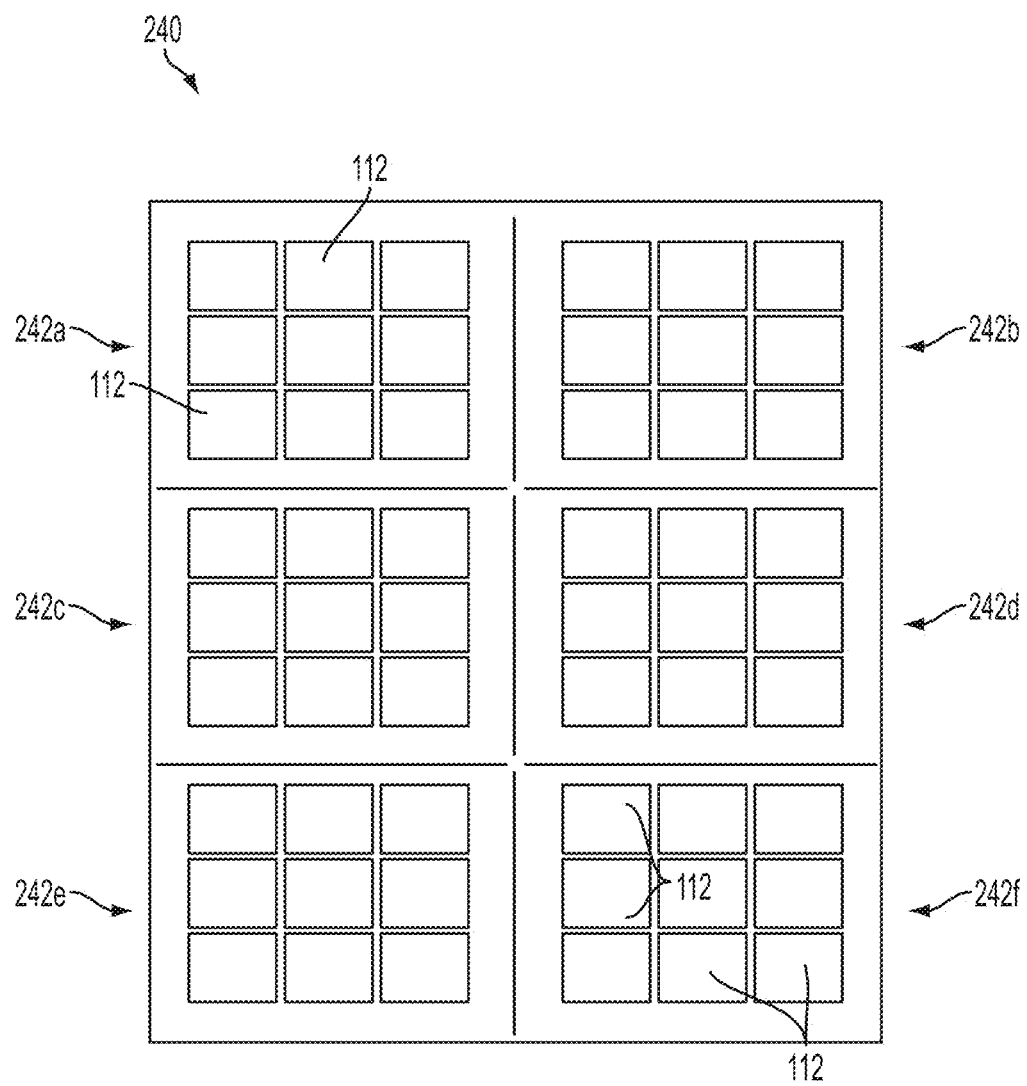
FIG. 9 is a top plan view of an illustrative storage facility including a plurality of exemplary containers.

FIG. 9 is a top plan view of a storage facility 240 including a plurality of exemplary containers 112, each receiving an asset 122. The containers 112 are illustratively arranged in a plurality of groups 242. In the illustrative embodiment, each group 242 includes nine (9) different containers 112.

Figure 10:
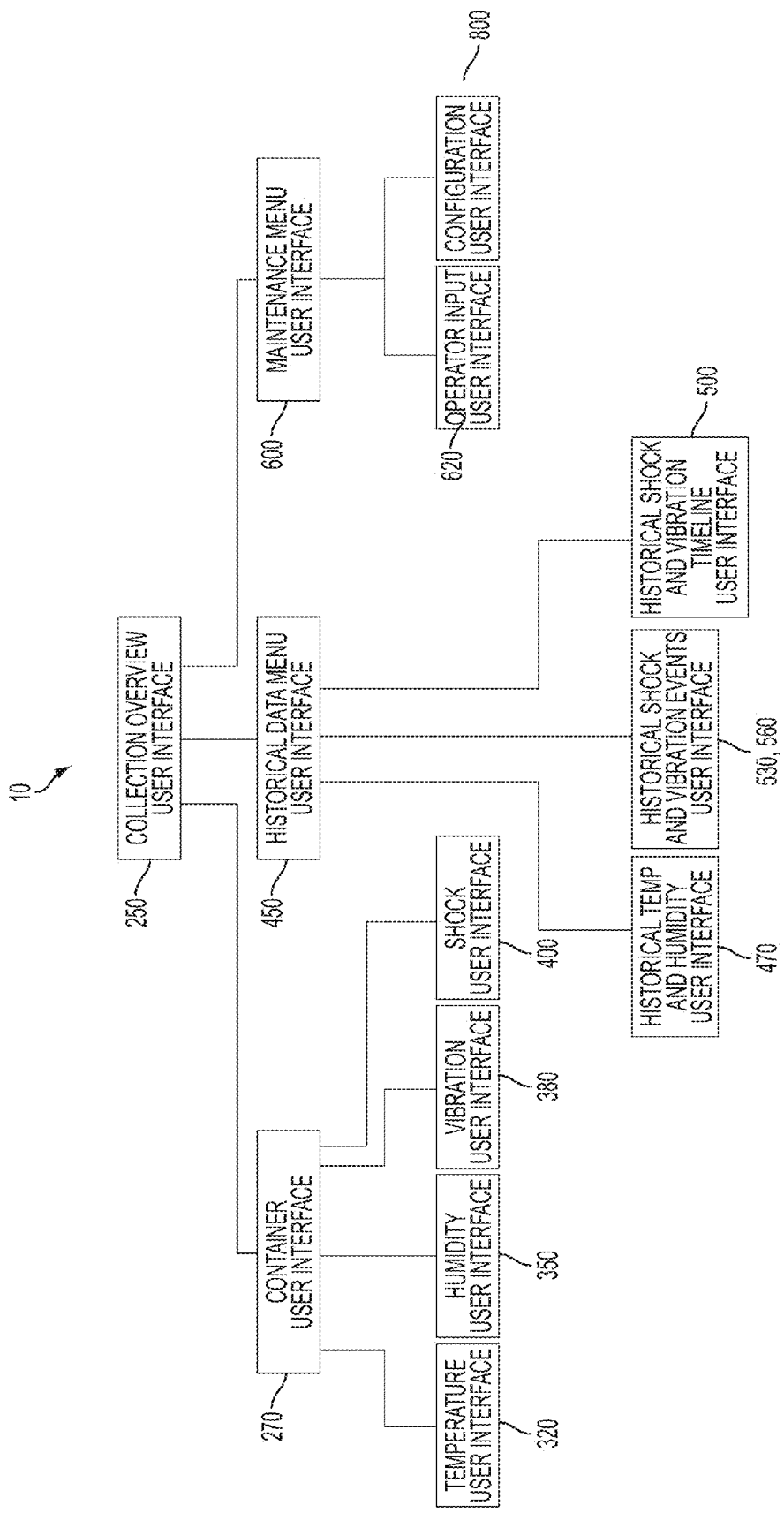
FIG. 10 is a block diagram showing various illustrative user interfaces of the environmental and condition monitoring system of FIG. 2.
Figure 11:
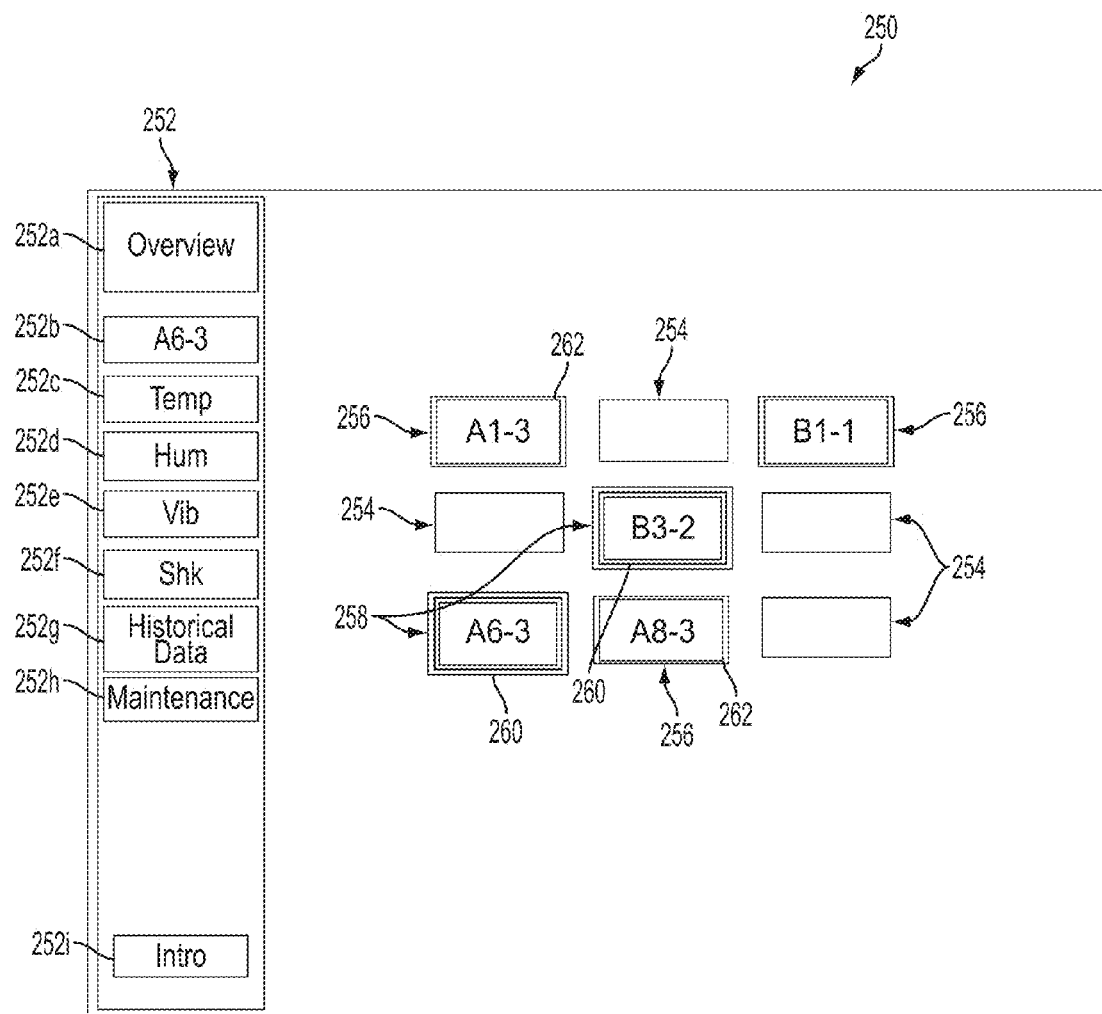
FIG. 11 is an illustrative overview user interface showing exemplary environmental condition status of a collection of containers.

With reference now to FIGS. 10 and 11, the environmental and condition monitoring system 10 includes a variety of different graphical user interfaces (GUI) accessible to an operator 16. It should be noted that the number, types and arrangements of GUIs in system 10 may vary from that represented in FIG. 10.

FIG. 11 is an exemplary collection overview display or graphical user interface (GUI) 250 showing the status of exemplary containers 112. This overview display 250 is illustratively defined by a monitor of user interface 48. Moreover, the illustrative display 250 shows a graphical representation of the environmental condition status of containers 112 from group 242a of FIG. 9. Similar displays 250 may be provided for different groups 242 of containers 12.

With further reference now to FIG. 11, the overview display 250 includes a left side menu bar 252 including a series of buttons allowing the operator to view different primary and secondary displays. For example, button 252a, which is labeled Overview, takes the user to overview display 250 of group 242a of containers 112. Button 252b, which is labeled A6-3, illustratively allows the used to access detailed information on container 112 with the identification (e.g., serial number) of A6-3 (stored in memory 46). Button 252c, which is labeled Temp, allows the user to access detailed display of temperature measurement readings of containers 112. Button 252d, which is labeled Hum, allows the user to access detailed display of humidity measurement readings of containers 112. Button 252e (labeled Vib) allows the user to access detailed display of vibration measurement readings of containers 112, while button 252f (labeled Shk) allows the user to access detailed display of shock measurement readings of containers 112. Button 252g (labeled Historical Data) allows a user to access historical measurement readings as stored in memory 46. Button 252h (labeled Maintenance) allows a user to access a maintenance display, while button 252i (labeled Intro) allows a user to access an introductory display with basic operating information about the system 10.

This overview display 250 of FIG. 11 corresponds to the topmost overview button 252a. Representative images or indicators 254, 256, 258 of overview display 250 (FIG. 11) represent containers 112 of group 242a (FIG. 9). Container indicators 254, 256 displaying an alphanumeric identifier in display 250 are instrumented (i.e., include sensor suites 24). For example, in the illustrative embodiment of FIG. 11, containers 112 with alphanumeric identifiers A1-3, B1-1, B3-2, A6-3 and A8-3 in indicators 256 and 258 are instrumented. Blank container indicators 254 in display 250 represent containers 112 that are not instrumented (i.e., do not include sensor suite 24).

The overview display 250 denotes the alert status of instrumented containers represented by indicators 256, 258, illustratively through a visual and/or audible alert or indicator. For example, a container 112 with one or more conditions (e.g., environmental condition measurements from sensor suite 24) outside allowable levels (determined by computer 42 based on values stored in memory 46) may be denoted by indicators 258 having a distinct color, such as red, or a distinctive border 260. Containers 112 with a normal status may be denoted by indicators 256 of another color, such as green, or a different type of border 262. This GUI or overview display 250 also allows the operator to view additional details about an instrumented container 112 by selecting the container representation on the display 250 with a mouse or similar device.

Figure 12:
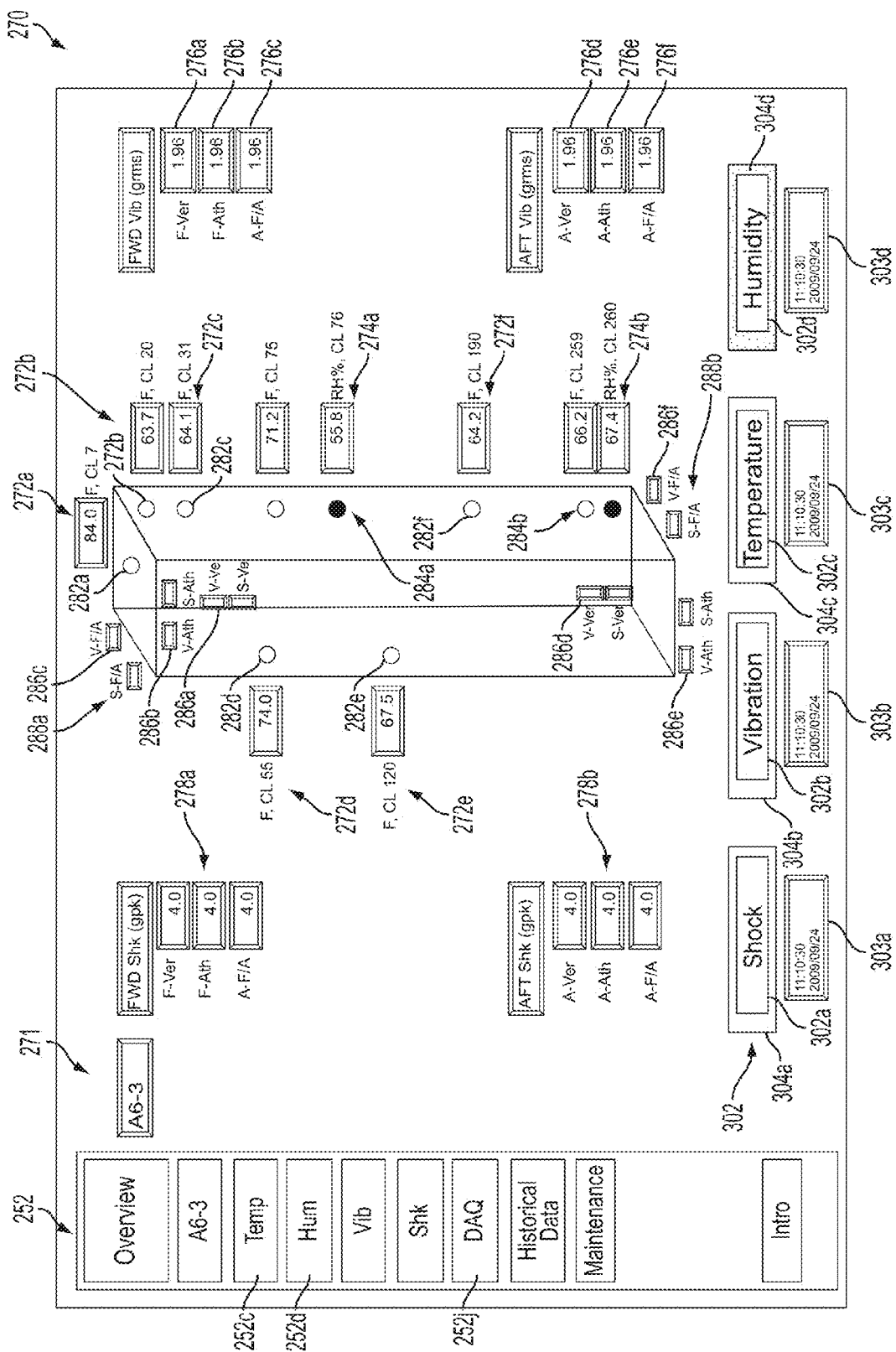
FIG. 12 is an illustrative detailed container user interface of exemplary environmental condition measurements associated with an exemplary container.

FIG. 12 is an exemplary detailed container display or graphical user interface (GUI) 270 of exemplary environmental condition measurements, available in real time, for an individual container 112. This overview display 270 is illustratively defined by the monitor of user interface 48. Moreover, the display 270 shows a graphical representation of the environmental condition status of all sensors 102, 104, 106, 108 associated with one of the containers 112 from group 242a of FIG. 9. Similar displays 270 may be accessed for each instrumented container 112 of the system 10.

The exemplary detailed container display 270 shows near real time environmental readings for container 112 identified by alphanumeric serial number A6-3 in display box 271. The container 112 of interest may be selected by pressing its representation on the overview display 250 (FIG. 11). This illustrative individual container display 270 shows exemplary temperature, humidity, vibration, and shock measurement reading levels 272, 274, 276 and 278 from the sensor suite 24. For example, display boxes 272a, 272b, 272c, 272d, 272e, and 272f show the most recent temperature measurement readings from temperature sensors 102a, 102b, 102c, 102d, 102e, and 102f, respectively. Further, display boxes 274a and 274b show the most recent temperature and relative humidity measurements from humidity sensors 104a and 104b, respectively. As further detailed herein, the temperature and humidity (quasi-static environment) measurements are illustratively collected at preset intervals. Display boxes 276a, 276b, 276c and 276d, 276e, 276f illustratively show the most recent vibration measurements from vibrations sensors 106a, 106b, 106c, and 106d, 106e, 106f, respectively. Finally, display boxes 278a and 278b illustratively show the most recent shock measurements from shock sensors 108a and 108b, respectively. As further detailed herein, the vibration and shock (dynamic environment) measurements are either collected at preset intervals or when the magnitude exceeds a preset threshold. Thus, in certain illustrative embodiments when no measurements have met the preset threshold criteria, these display boxes 276 and 278 could be empty.

Each single container display 270 shows a representation or indicator 282, 284, 286, 288 of those sensors 102, 104, 106, 108, respectively, actually in the container 112. For example, the display 270 would only show temperature levels for a container 112 with temperature sensors 102. The display boxes 272, 274, 276, 278 show the latest measured levels of environmental conditions, and the status indicators 282, 284, 286, 288 convey whether the measured levels of environmental conditions are inside or outside preset allowable levels (stored in memory 46).

In the exemplary display 270 of FIG. 12, temperature sensors 102 are represented by indicators 282, humidity sensors 104 are represented by indicators 284, vibration sensors 106 are represented by indicators 286, and shock sensors 108 are represented by indicators 288. Each display box 272, 274, 276, 278 associated with a respective indicator 282, 284, 286, 288 shows information related to measurement units and sensor identity or position.

With reference to exemplary display 270 of FIG. 12, display boxes 272 indicate that the readings from temperature sensors 102 are provided in measurement units of degrees Fahrenheit. The display boxes 272 also provide container location (CL) information of each respective sensor 102. For example, display box 272a indicates that sensor 102a most recently measured a temperature of 84.0° F. and is located at container location (CL) 7 (i.e., 7 inches from the upper end of the container 112. Similarly, display box 272b indicates that sensor 102b most recently measured a temperature of 63.7° F. and is located at container location (CL) 20 (i.e., 20 inches from the upper end of the container 112).

Illustrative display boxes 274 indicate that the readings from humidity sensors 104 are provided in measurement units of relative humidity percentage. The humidity sensors 104 may also provide additional temperature readings shown in display boxes 274 in measurement units of degrees Fahrenheit. The display boxes 274 also provide container location (CL) information of each respective sensor 104. For example, display box 274a indicates that sensor 104a most recently measured a relative humidity of 55.8% at container location (CL) 76 (i.e., 76 inches from the upper end of the container 112). Display box 274a further indicates that sensor 104a most recently measured a temperature of 71.2° F. at container location (CL) 75 (i.e., 75 inches from the upper end of the container 112).

Illustrative display boxes 276 indicate that the readings from vibration sensors 106 are provided in measurement units of grms (root mean square acceleration), and provide a notation of the source sensors (FWD Vib being the forward vibration sensors 106a, 106b, 106c, and AFT Vib being the rearward or aft vibration sensors 106d, 106e, 106f). Display boxes 276a, 276b, and 276c provide readings from sensors 106a, 106b, and 106c of acceleration in z, x, and y directions, respectively (corresponding to F-Ver, F-Ath, and F-F/A notations in FIG. 12). Similarly, display boxes 276d, 276e, and 276f, provide readings from sensors 106d, 106e, and 106f of acceleration in z, x, and y directions (corresponding to F-Ver, F-Ath, and F-F/A notations in FIG. 12).

Illustrative display boxes 278 indicate that the readings from shock sensors 108 are provided in measurement units of gpk (peak acceleration), and provide a notation of the source sensors (FWD Shk being the forward shock sensor 108a, and AFT Shk being the rearward or aft shock sensor 108b). Display boxes 278a and 278b provide readings from sensors 108a and 108b of acceleration in z, x, and y directions (corresponding to F-Ver, F-Ath, and F-F/A notations in FIG. 12).

In the exemplary display 270, a humidity condition is outside the preset acceptable range as shown by the red colored infill of humidity sensor representations 284a and 284b. The representations of sensors 102, 106, 108 illustratively include green colored infill to represent respective environmental condition measurement readings within preset acceptable ranges. The digital display of sensor representations 282, 284, 286, 288 are illustratively disabled when a respective sensor 102, 104, 106, 108 goes offline (i.e., no longer transmits environmental condition measurement readings to measurement units 36, 38).

For quasi-static environments, the display boxes 272 and 274 of exemplary digital display 270 contain the single measured level. For dynamic environments, the display boxes 276 and 278 of exemplary digital display 270 contains a composite level, such as the peak or the mean. A lower menu bar 302 includes exemplary buttons 302a, 302b, 302c and 302d, each of which indicate the status of the parameters or environmental conditions measured in the individual container 112, and which may be accessed to generate a new display that shows more details about the selected parameter (shock, vibration, temperature and humidity, respectively). Date and time stamps are provided in display boxes 303a, 303b, 303c and 303d and are associated with buttons 302a, 302b, 302c and 302d for providing the date and time of the most recent measurement of respective environmental conditions. The temperature and humidity (quasi-static environment) measurements are collected at a preset interval. The vibration and shock (dynamic environment) measurements are either collected at a preset interval or when the magnitude exceeds a preset threshold. Thus, when no measurements have met the criteria for vibration and/or shock, these displays could be empty.

In the exemplary display 270, outlines 304a, 304b, 304c of buttons 302a, 302b, 302c are of a different color or otherwise distinguishable from the outline 304d of button 302d. For example, outlines 304a, 304b, 304c are green to indicate environmental condition measurements are within the respective preset acceptable ranges, while outline 304d of humidity button 302d indicates that the humidity measurement readings from the sensors 104 are outside the preset acceptable range. Pressing exemplary buttons 252c-252f along the left menu bar 252 also generates the detailed display or GUI of the requested parameter. These exemplary detailed displays are shown in FIGS. 13-16.

Figure 13:
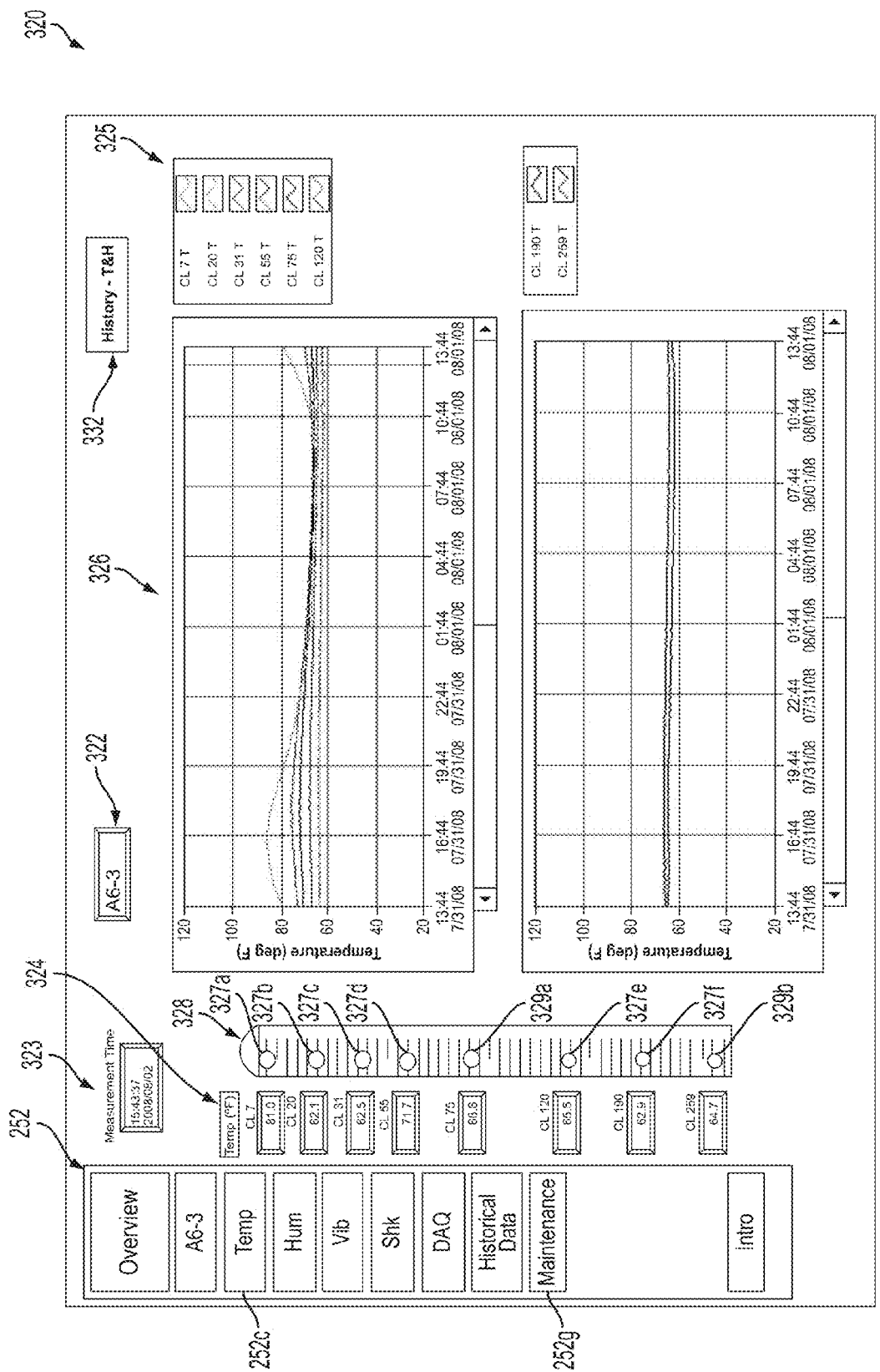
FIG. 13 is an illustrative detailed temperature user interface of exemplary temperature measurements for the exemplary container of FIG. 12.

FIG. 13 is an exemplary detailed display or graphical user interface (GUI) 320 of temperature measurements from one exemplary container 112. This display 320 may be accessed by selecting the Temp button 252c along the left menu bar 252, or by selecting the Temperature button 302c on the individual container display 270 (FIG. 12). The exemplary display 320 shows the latest temperature measurement readings recorded for container 112 as identified in display box 322 (in the illustrative embodiment container 112 with the serial number A6-3).

With further reference to the exemplary graphical user interface 320 of FIG. 13, the measurement date and time is shown in a display box 323, while the identification (e.g., A6-3) of the selected container 112 of interest is displayed in a display box 322. A display table 324 in detailed user interface 320 shows the measured temperature readings from each temperature sensor 102, as well as charts 326 showing time profiles of the exemplary recently recorded temperatures. In chart 326, the temperature readings from different sensors 102 may be distinguished by different line colors, patterns and/or shading as reference in display boxes 325.

A status bar 328 of display 320 may provide an alert indication if sensor readings are outside of a predefined range. The status bar 328 includes representations or indicators 327, 329 of each sensor 102, 104. The indicators 327, 239 for sensors 102, 104 having measurement readings within the predefined range may be distinguished (e.g., green colored fill), from those indicators 327, 329 for sensors 102, 104 having measurement readings outside of the predefined range (e.g., red colored fill). A temperature historical archive may be accessed by selecting button 322 (labeled History—T&H) or button 252g (labeled Historical Data) on menu bar 252. The exemplary program could generate a similar display for any quasi-static environment, such as relative humidity (FIG. 14) and/or pressure.

Figure 14:
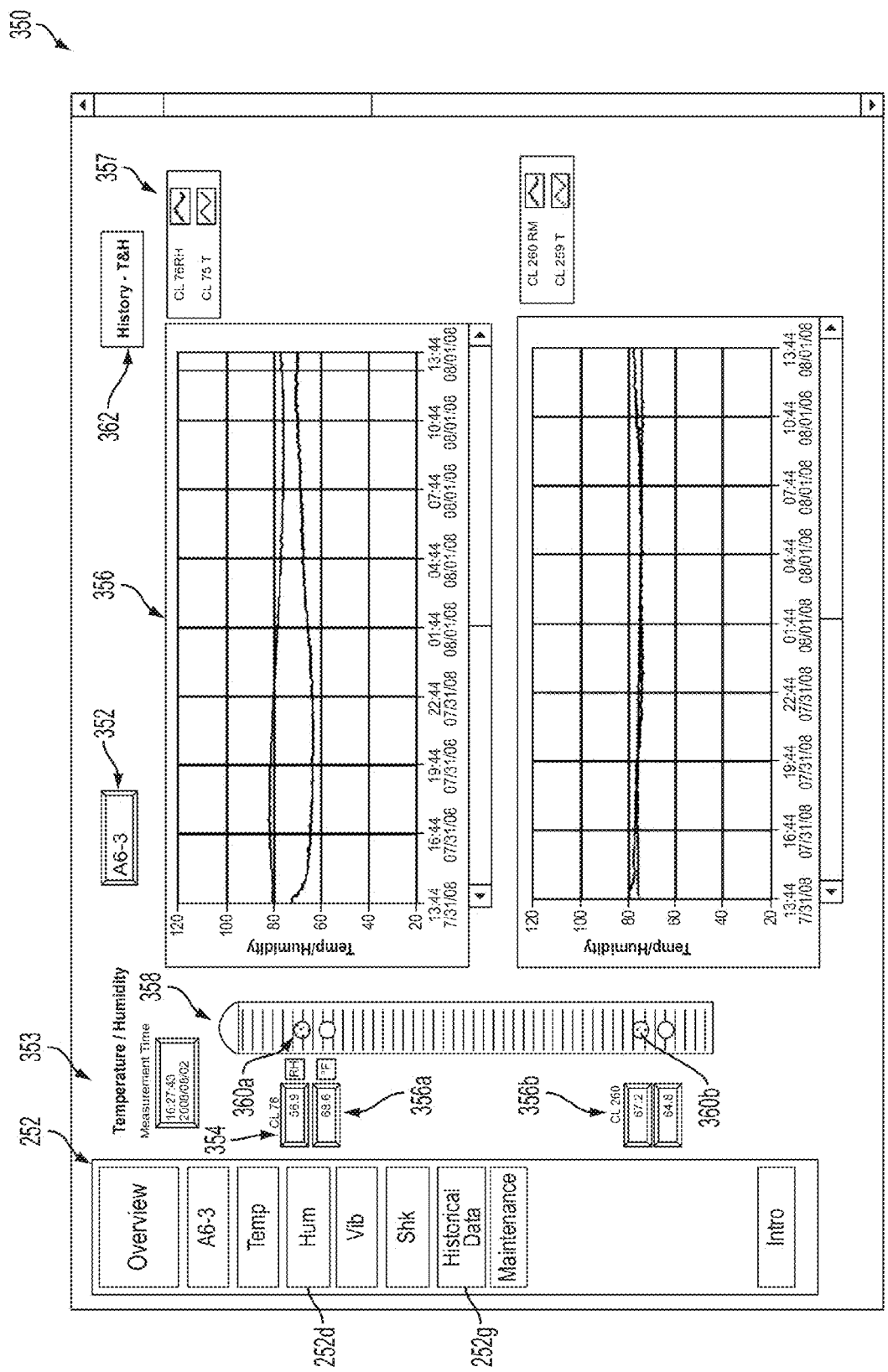
FIG. 14 is an illustrative detailed humidity user interface of exemplary relative humidity measurements for the exemplary container of FIG. 12.

FIG. 14 is an exemplary detailed display or graphical user interface (GUI) 350 of temperature and relative humidity measurements from one exemplary container 112. This display 350 may be accessed by selecting the Hum button 252d along the left menu bar 252, or by pressing the Humidity button 302d on the individual container display 270 (FIG. 12). The exemplary display 350 shows the latest temperature and humidity measurement readings recorded as identified in display box 301 (in the illustrative embodiment container 112 with the serial number A6-3).

With further reference to the exemplary graphical user interface 350 of FIG. 14, the latest measurement date and time is shown in a display box 353, while the identification (e.g., A6-3) of the selected container 112 of interest is displayed in a display box 352. A display table 354 in detailed display 350 shows the measured relative humidity (and temperature) readings from each humidity sensor 104, as well as charts 356 showing time profiles of the exemplary recently recorded temperature and humidity readings. In chart 356, the readings from different sensors 104 may be distinguished by different line colors, patterns and/or shading as referenced in display boxes 357.

A status bar 358 of display 350 may provide an alert indication if sensor readings are outside of a predefined range. The status bar 358 includes representations or indicators 360 of each sensor 104. The indicators 360 for sensors 104 having measurement readings within the predefined range may be distinguished (e.g., green colored fill), from those indicators 360 for sensors 104 having measurement readings outside of the predefined range (e.g., red colored fill). A relative humidity historical archive may be accessed by selecting button 362 (labeled History—T&H) or button 252g (labeled Historical Data) on menu bar 252.

Figure 15:
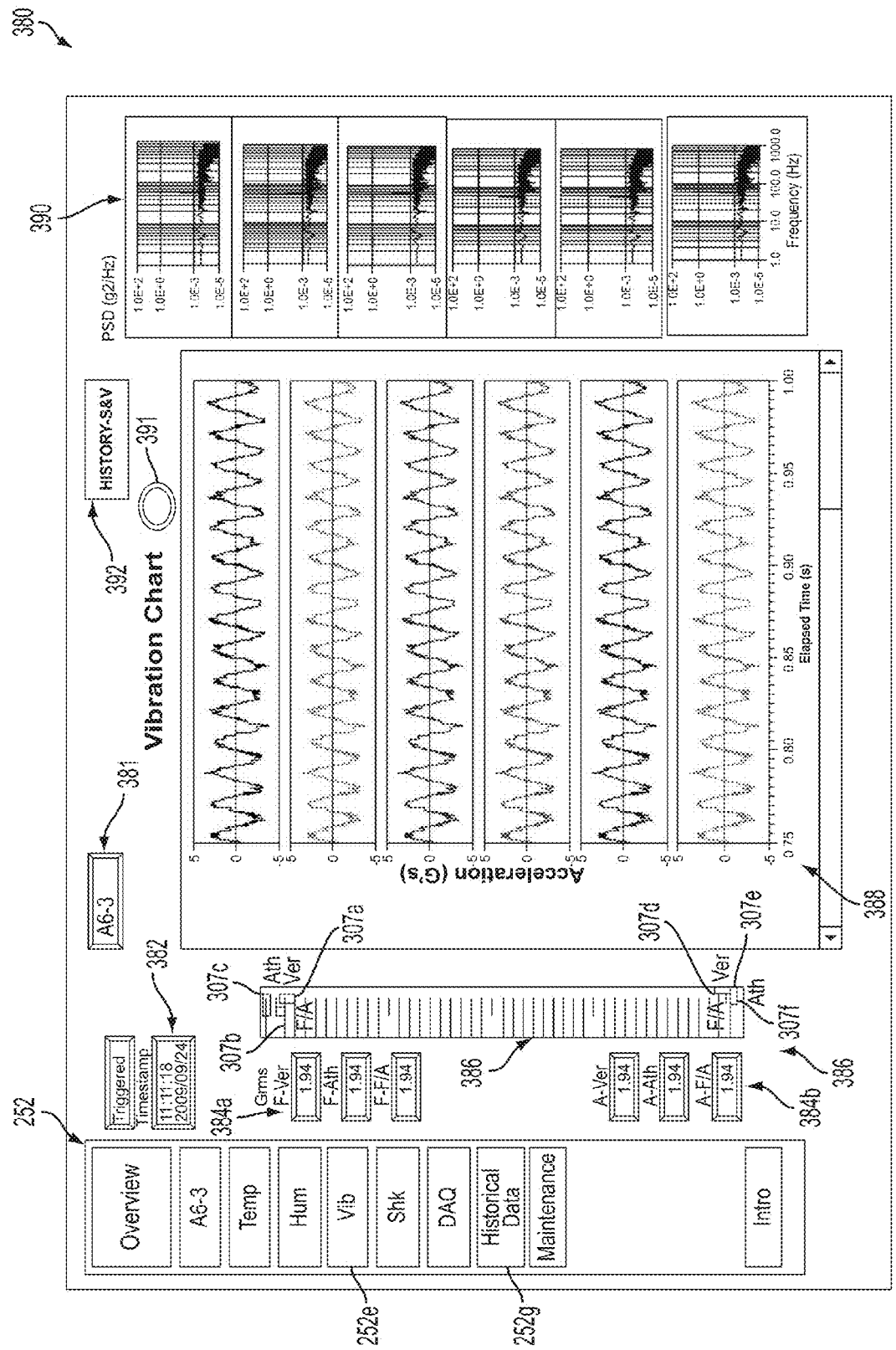
FIG. 15 is an illustrative detailed vibration user interface of exemplary vibration measurements for the exemplary container of FIG. 12.

FIG. 15 is an illustrative display or graphical user interface (GUI) 380 of vibration measurements from one exemplary container 112. This display 380 may be accessed by the Vib button 252e along the left menu bar 252, or by pressing the Vibration button 302b on the individual container display 270 (FIG. 12). For each display 380, an exemplary display box 382 shows the latest data acquisition time and status, and the identification (e.g., A6-3) of the selected container 112 of interest is displayed in a display box 381. For each vibration sensor 106 (e.g., accelerometer), there is provided a digital display 384, a status bar 386, a waveform graph 388, and a frequency spectrum graph 390. The waveforms may be filtered or not filtered.

The digital display 384 contains the composite level appropriate for the type of waveform. For vibration, the display 384 shows the mean magnitude. The exemplary program may use the method disclosed in FIG. 5 to create this display 384. The illustrative status bar 386 includes representations or indicators 307 of each vibration sensor 106. The indicators 307 for sensors 106 having measurement readings within the predefined range may be distinguished (e.g., green colored fill), from those indicators 307 for sensors 106 having measurement readings outside of the predefined range (e.g., red colored fill). An overall status indicator 391 may be provided as a quick indication as to whether any of the measurement readings within the table are outside of the predefined range. In one illustrative embodiment, the status indicator 391 may be green with all measurements within display 380 are within the predefined range, and may be red when any of the measurements within the display 380 are outside of the predefined range. A vibration historical archive may be accessed by selecting button 392 (labeled History—S&V), or button 252g (labeled Historical Data) on menu bar 252. The exemplary program could generate a similar display for any dynamic environment, such as shock (FIG. 16) and/or acoustics.

Figure 16:
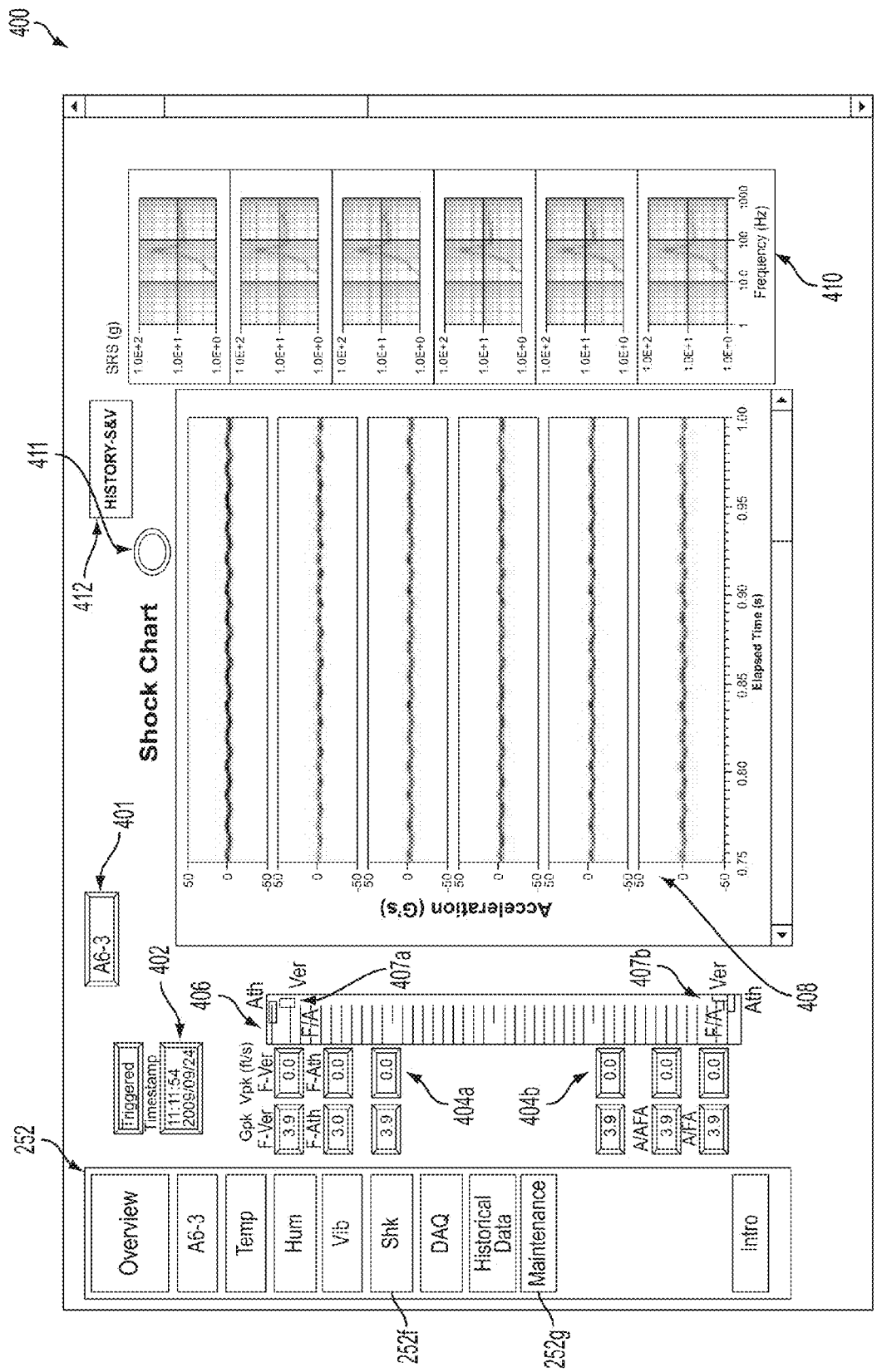
FIG. 16 is an illustrative detailed shock user interface of exemplary shock measurements for the exemplary container of FIG. 12.

FIG. 16 is an illustrative display or graphical user interface (GUI) 400 of exemplary shock measurements from one exemplary container 112. This display 400 may be accessed by the Shk button 252f along the left menu bar 252, or by pressing the Shock button 302a on the individual container display 270 (FIG. 12). For each display 400, an exemplary display box 402 shows the latest data acquisition time and status, and the identification (e.g, A6-3) of the selected container 112 of interest is displayed in a display box 401. For each shock sensor 108 (e.g., accelerometers), there is provided a digital display 404, a status bar 406, a waveform graph 408, and a frequency spectrum graph 410. The waveforms may be filtered or not filtered.

The digital display 404 contains the composite level appropriate for the type of waveform. For example, the display 404 shows the peak magnitude and peak velocity for shock. The exemplary program may use the method disclosed in FIG. 5 to create this display 404. The illustrative status bar 406 includes representations or indicators 407 of each shock sensor 108. The indicators 407 for sensors 108 having measurement readings within the predefined range may be distinguished (e.g., green colored fill), from those indicators 407 for sensors 108 having measurement readings outside of the predefined range (e.g., red colored fill). An overall status indicator 411 may be provided as a quick indication as to whether any of the measurement readings within the table are outside of the predefined range. In one illustrative embodiment, the status indicator 411 may be green with all measurements within display 380 are within the predefined range, and may be red when any of the measurements within the display 380 are outside of the predefined range. A shock historical archive may be accessed by selecting button 412 (labeled History—S&V), or button 252g (labeled Historical Data) on menu bar 252.

Figure 17:
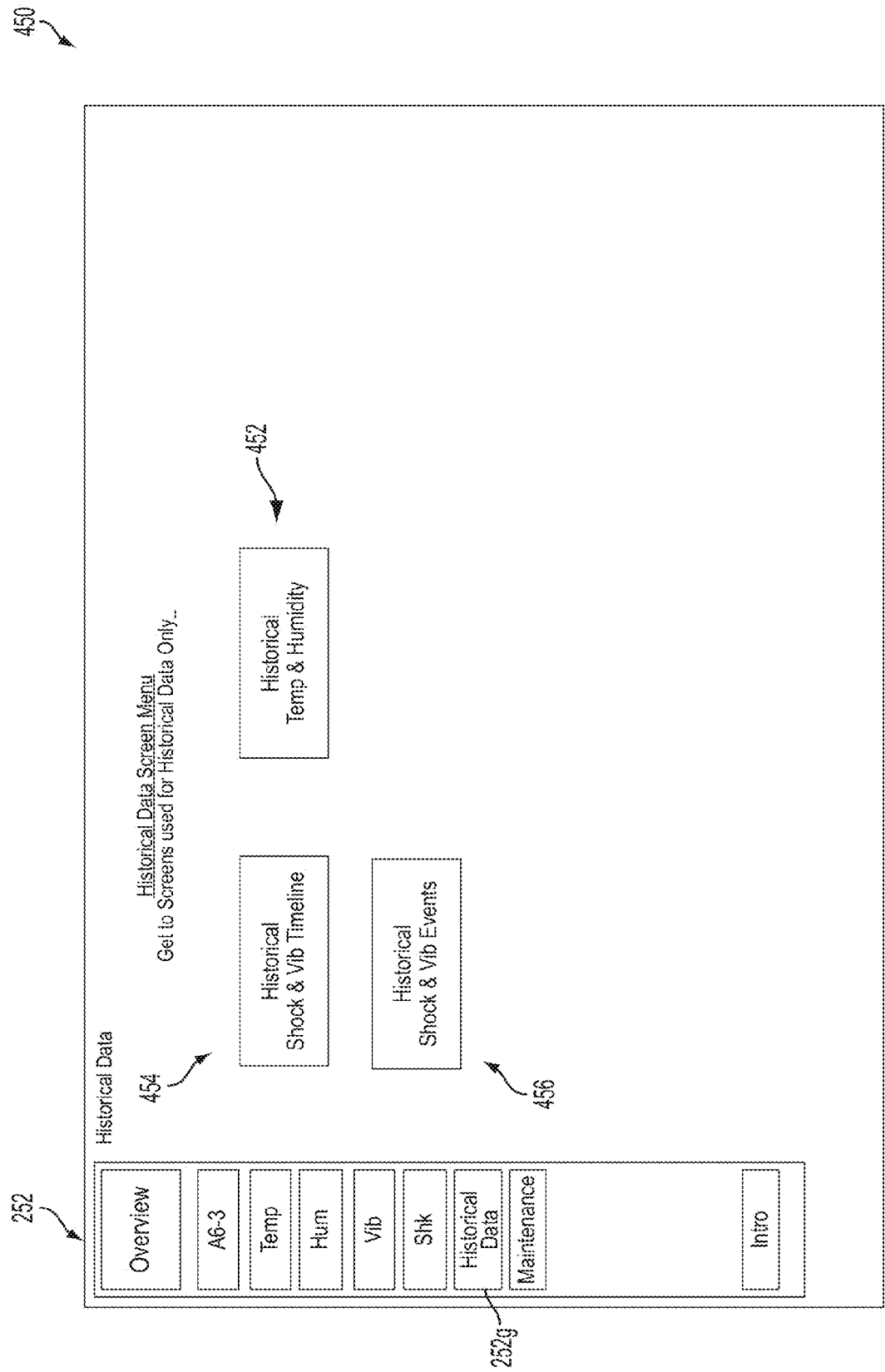
FIG. 17 is an illustrative historical data menu user interface for accessing archived environmental condition measurements.

FIG. 17 is an illustrative historical data screen menu display or graphical user interface (GUI) 450 of exemplary buttons 452, 454 and 456 that may be selected to access archived measurements (e.g., stored in memory 46). This display 450 may be accessed by selecting the Historical Data button 252g of the left menu bar 252. When the display 450 is accessed, the operator may select Temp & Humidity button 452, Shock & Vib Timeline button 454, or Shock & Vib Events button 456. More particularly, selecting Historical Temp & Humidity button 452 will take the operator to a historical temperature and humidity display or graphical user interface (GUI) 470 shown in FIG. 18, selecting Historical Shock & Vib Timeline button 454 will take the operator to a historical shock and vibration timeline display 500 shown in FIG. 19, and selecting Historical Shock & Vib Events button 456 will take the operator to a historical shock and vibration events display or graphical user interface (GUI) 530, 560 shown in FIGS. 20 and 21.

Figure 18:
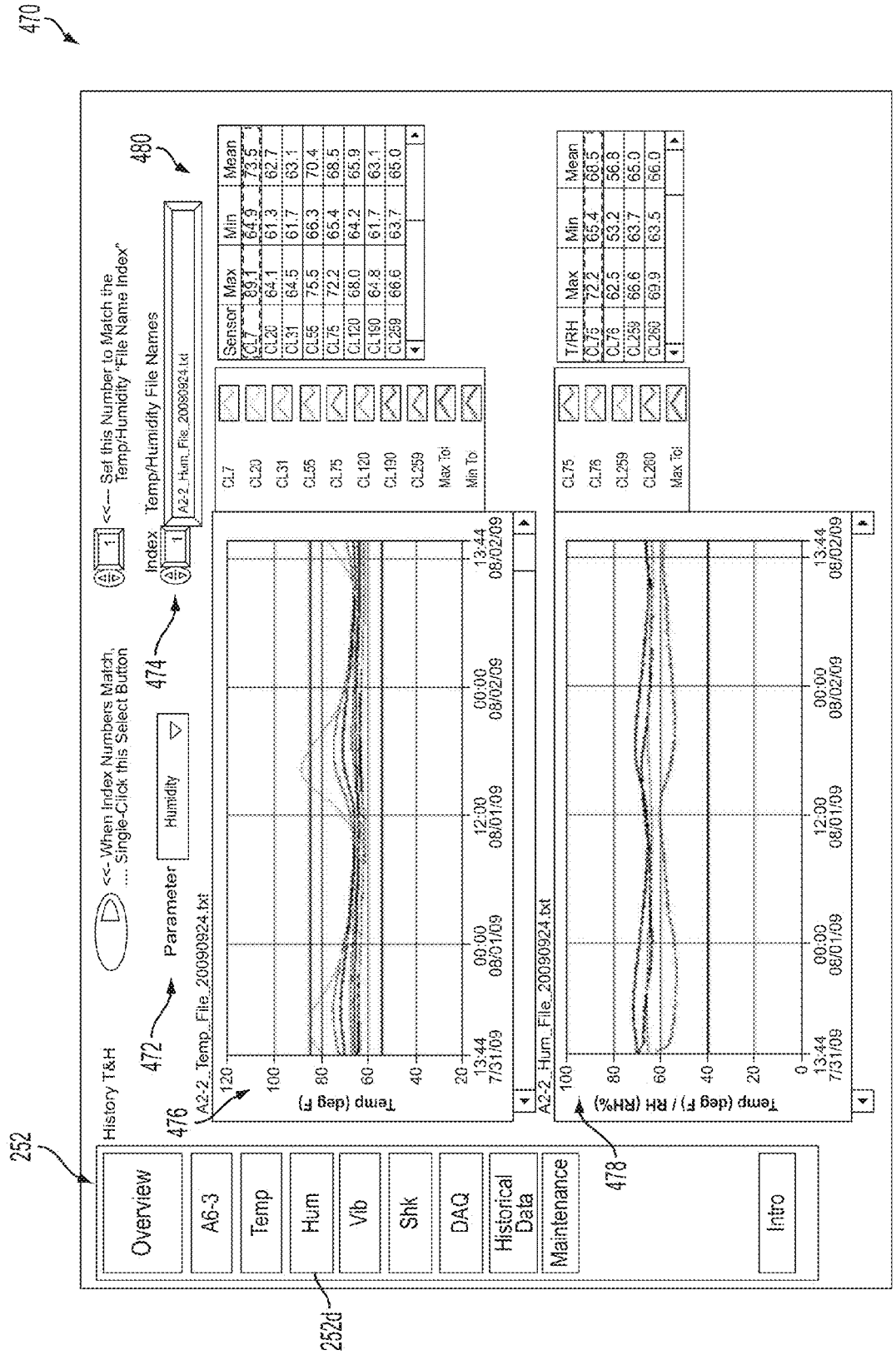
FIG. 18 is a sample user interface of an illustrative archived dataset of temperature and humidity measurements for an exemplary container.

FIG. 18 is illustrative historical temperature and humidity display or graphical user interface (GUI) 470 of exemplary archived temperature and humidity measurements for an exemplary container 112. The operator selects the parameter (temperature or humidity) to be displayed at button 472, and container/time period to be displayed at listbox 474. Exemplary graphs 476 and 478 may show both the archived data and exemplary allowable levels. The exemplary display 470 also shows statistics for the archived data in charts 480. The program generates a similar display, using composite levels, for shock and vibration in display 500 (FIG. 19).

Figure 19:
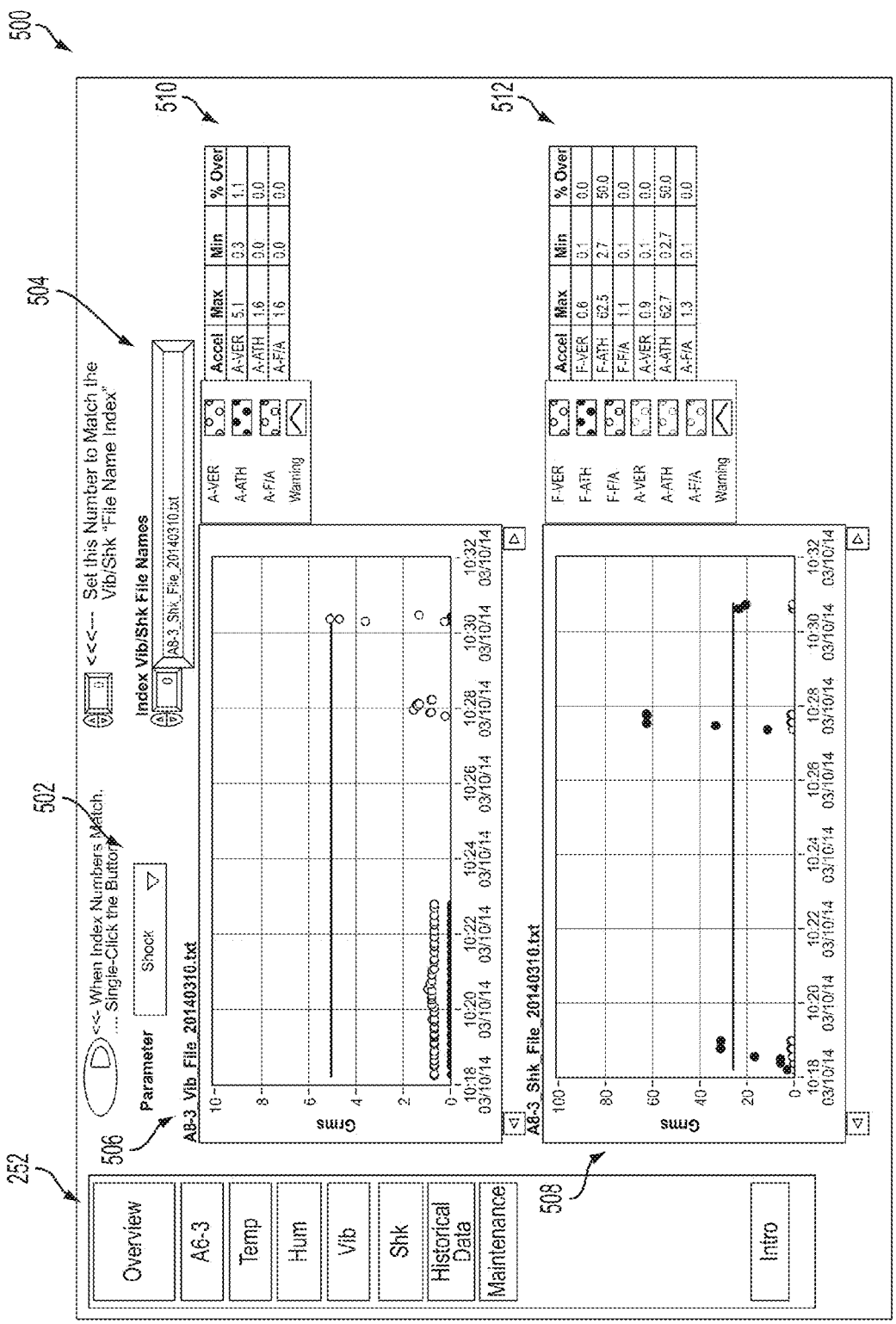
FIG. 19 is a sample user interface of an illustrative archived dataset of vibration and shock measurements for an exemplary container, shown in a timeline format.

FIG. 19 is an illustrative historical vibration display or graphical user interface (GUI) 500 of exemplary vibration archived dataset for one exemplary container 112, shown in a timeline format. More particularly, FIG. 19 is an illustrative historical shock and vibration timeline display 500 of exemplary archived shock and vibration measurements for an exemplary container 112. The operator selects the parameter (shock or vibration) to be displayed at button 502, and container/time period to be displayed at listbox 504. This selection by the operator causes the computer 42 to retrieve the appropriate data from memory 46 for display on user interface 48. Exemplary graphs 506 and 508 may show both the archived data and exemplary allowable levels. The exemplary display also shows statistics for the archived data 510 and 512.

Figure 20:
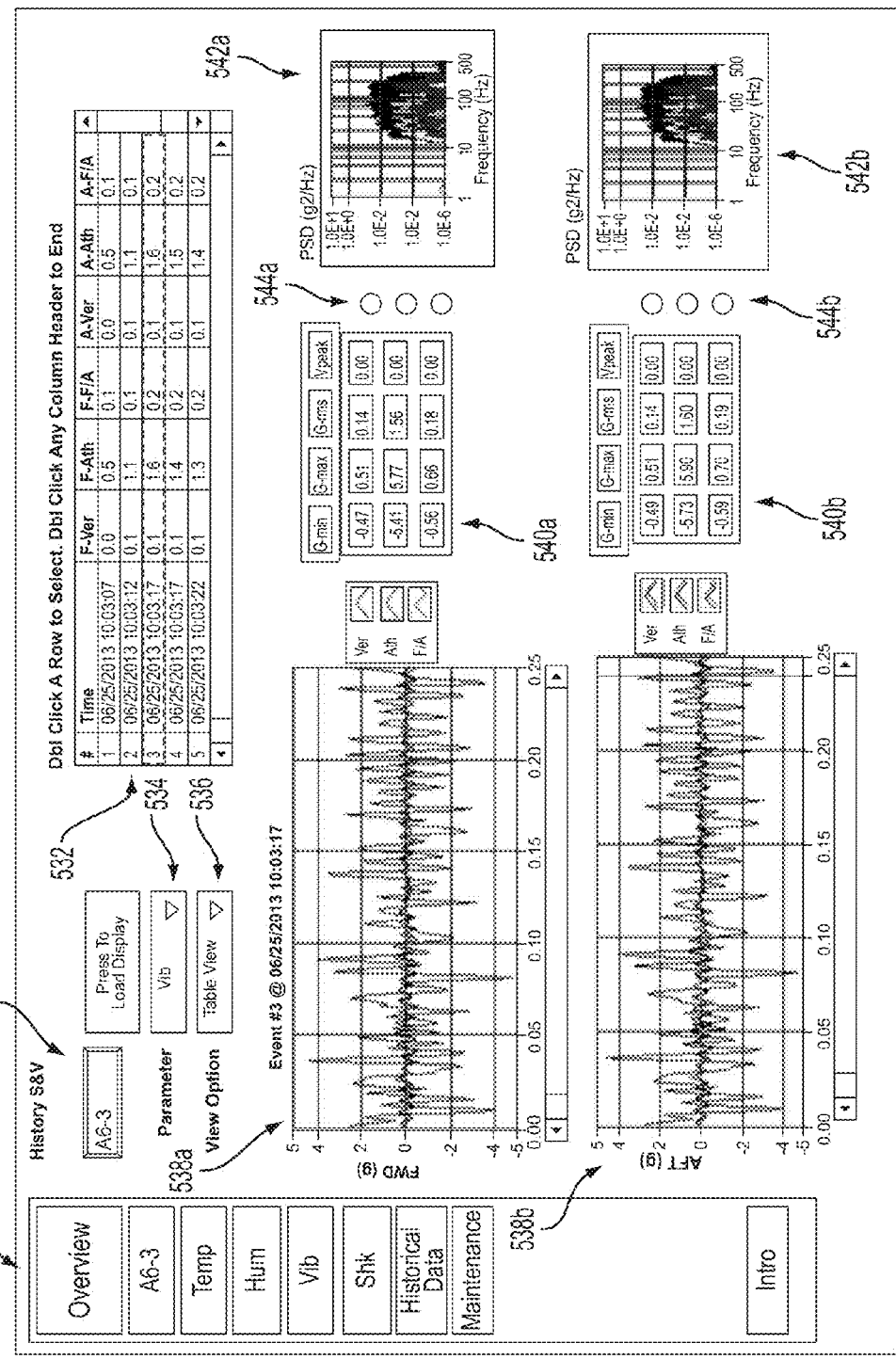
FIG. 20 is a sample user interface for displaying archived vibration waveforms for an exemplary container, including an event selection table.

FIG. 20 is a further illustrative historical shock and vibration event display or graphical user interface (GUI) 530. Display 530 shows an illustrative vibration archived waveform for exemplary container 12. The operator selects the parameter (vibration or shock) to be displayed at button 534, and the view option (table or direct) at button 536. The table option, shown in this illustrative display, allows the user to select a waveform from an Event Table 532. Exemplary graphs 538 of the selected archived vibration waveforms are displayed, along with data charts 540 and spectrum graphs 542. Status indicators 544 are provided on the display 530 to indicate (e.g. through green or red fill) whether any of the measured readings are outside of preset ranges.

Figure 21:
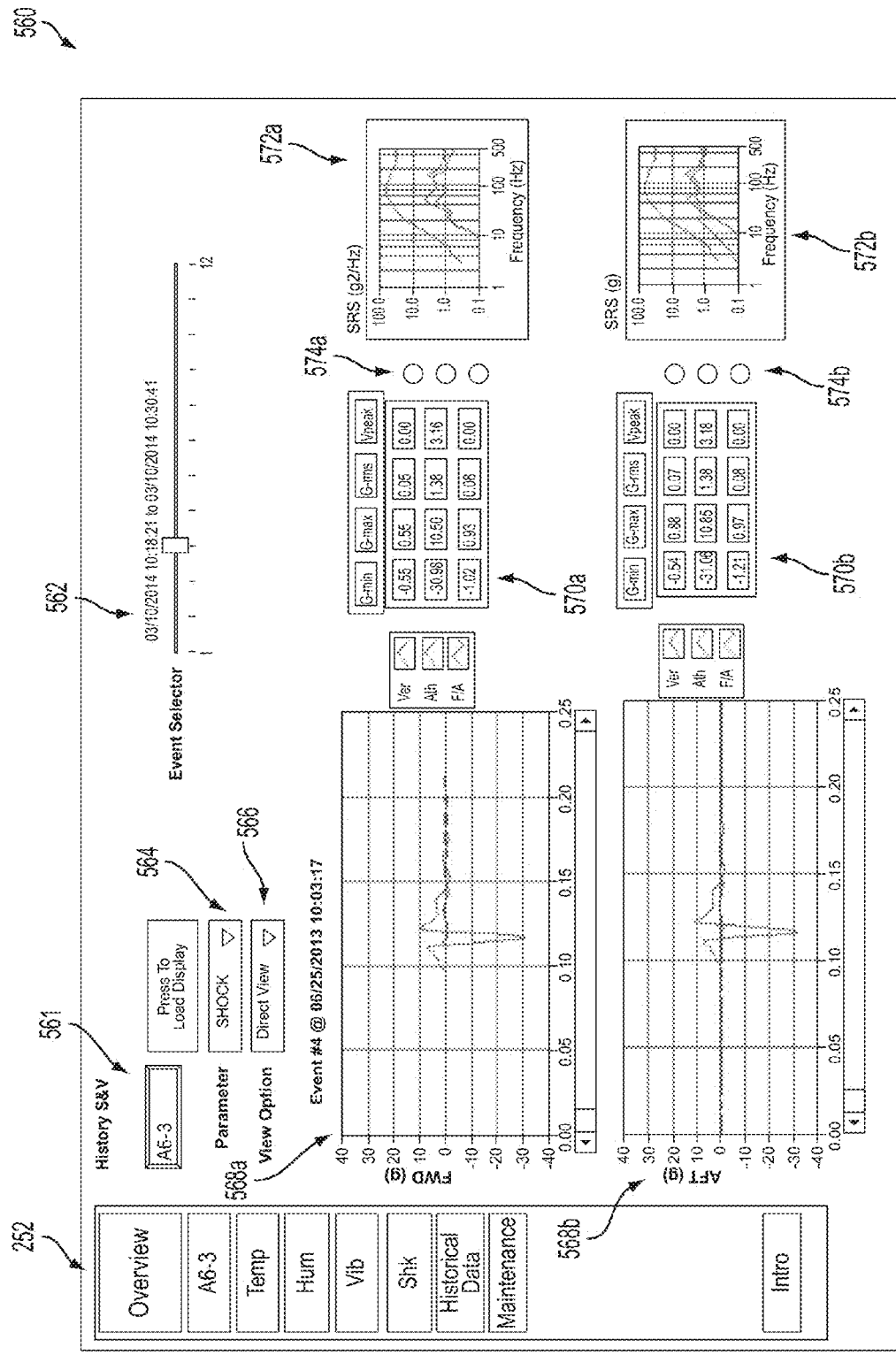
FIG. 21 is a sample user interface for displaying archived shock waveforms for an exemplary container, including an event selector bar.

FIG. 21 is a further illustrative historical shock and vibration event display or graphical user interface (GUI) 560. Display 560 shows an illustrative shock archived waveform for exemplary container 112. The container 112 may be selected on the container overview display 250 (FIG. 11). The operator selects the dynamic environment (vibration or shock) to be displayed at button 564, and the view option (table or direct) at button 566. The direct view option, shown in this illustrative display, allows the user to select a waveform from an Event Selector 562. For each waveform, the exemplary display 560 includes a waveform graph 568, waveform properties 570, spectrum graph 572, and status indicators 574. The exemplary program generates the appropriate spectrum for each dynamic environment type, such as power spectral density for vibration and a shock response spectrum for shock. Status indicators 574 are provided on the display 560 to indicate (e.g. through green or red fill) whether any of the measured readings are outside of preset ranges.

Figure 22:
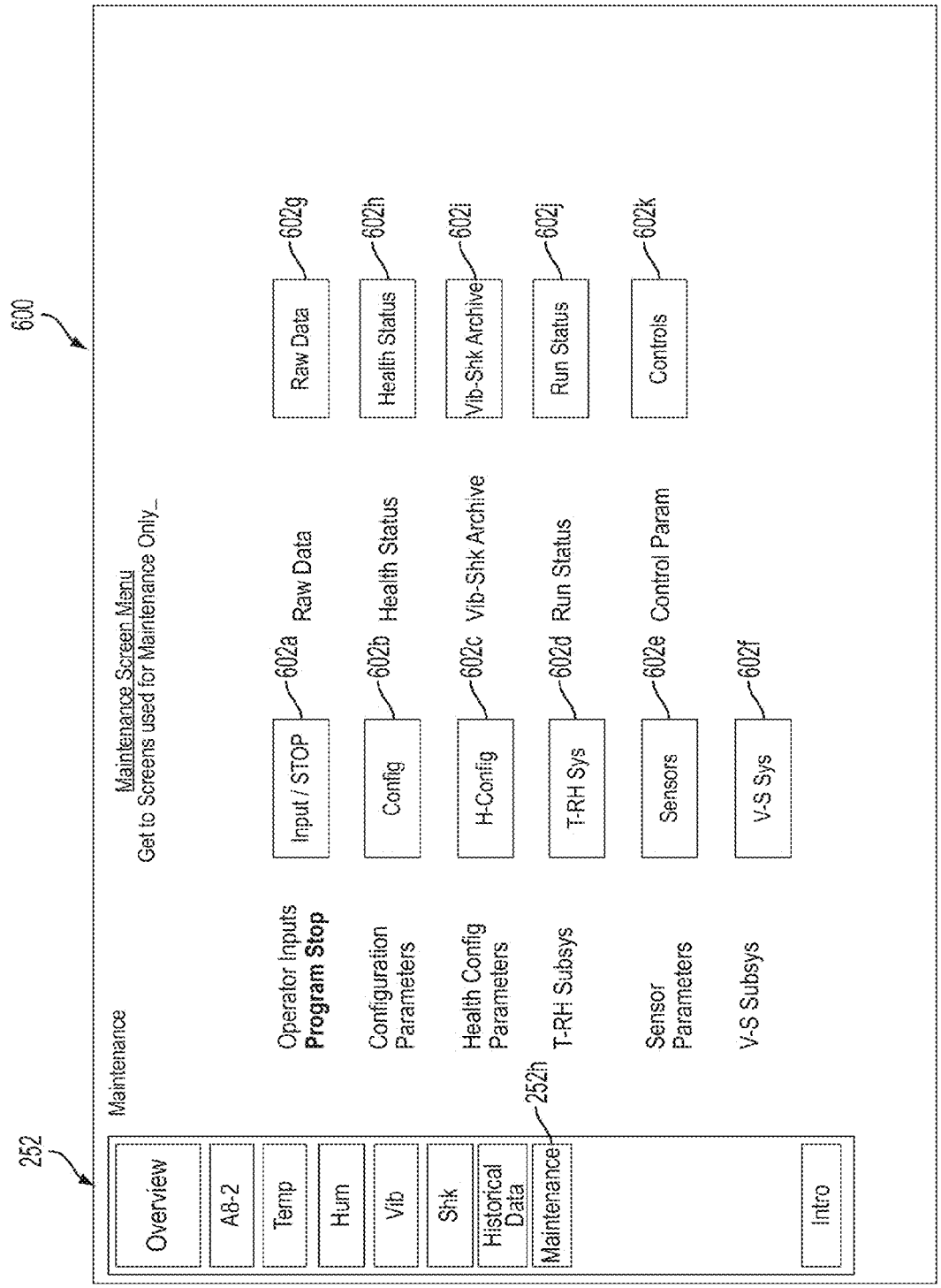
FIG. 22 is an illustrative maintenance menu user interface for accessing maintenance information of the illustrative environmental and condition monitoring system of FIG. 2.

FIG. 22 is an illustrative maintenance menu display or graphical user interface (GUI) 600 for accessing illustrative maintenance information of the environmental and condition monitoring system 10. The exemplary display 600 includes exemplary buttons 602 to access program maintenance information. This display 600 may be accessed by pressing the Maintenance button 252h along the left menu bar 252. The operator may view program inputs 602a, container instrumentation configurations 602b, self-health monitoring instrument configuration 602c, quasi-static subsystem information (a Temperature-Humidity subsystem in this embodiment) 602d, sensor models and types 602e, dynamic subsystem information (Vibration-Shock in this embodiment) 602f, raw data 602g, system health status 602h, archived data 602i, run status 602j, and data controls 602k. These displays could be used for system trouble-shooting.

Figure 23:
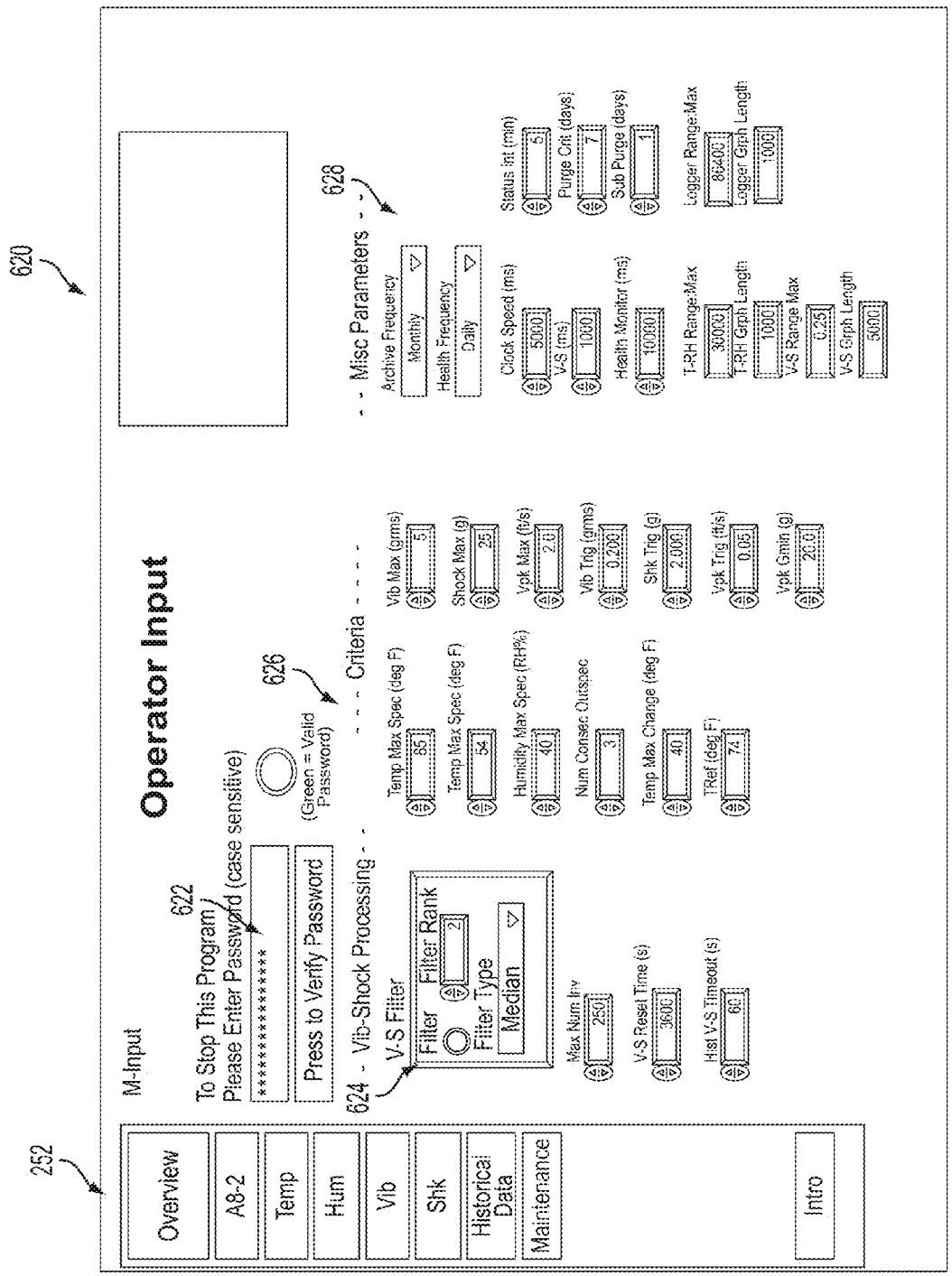
FIG. 23 is an illustrative operator input user interface for accessing operating parameters of the illustrative environmental and condition monitoring system of FIG. 2.
Figure 25:
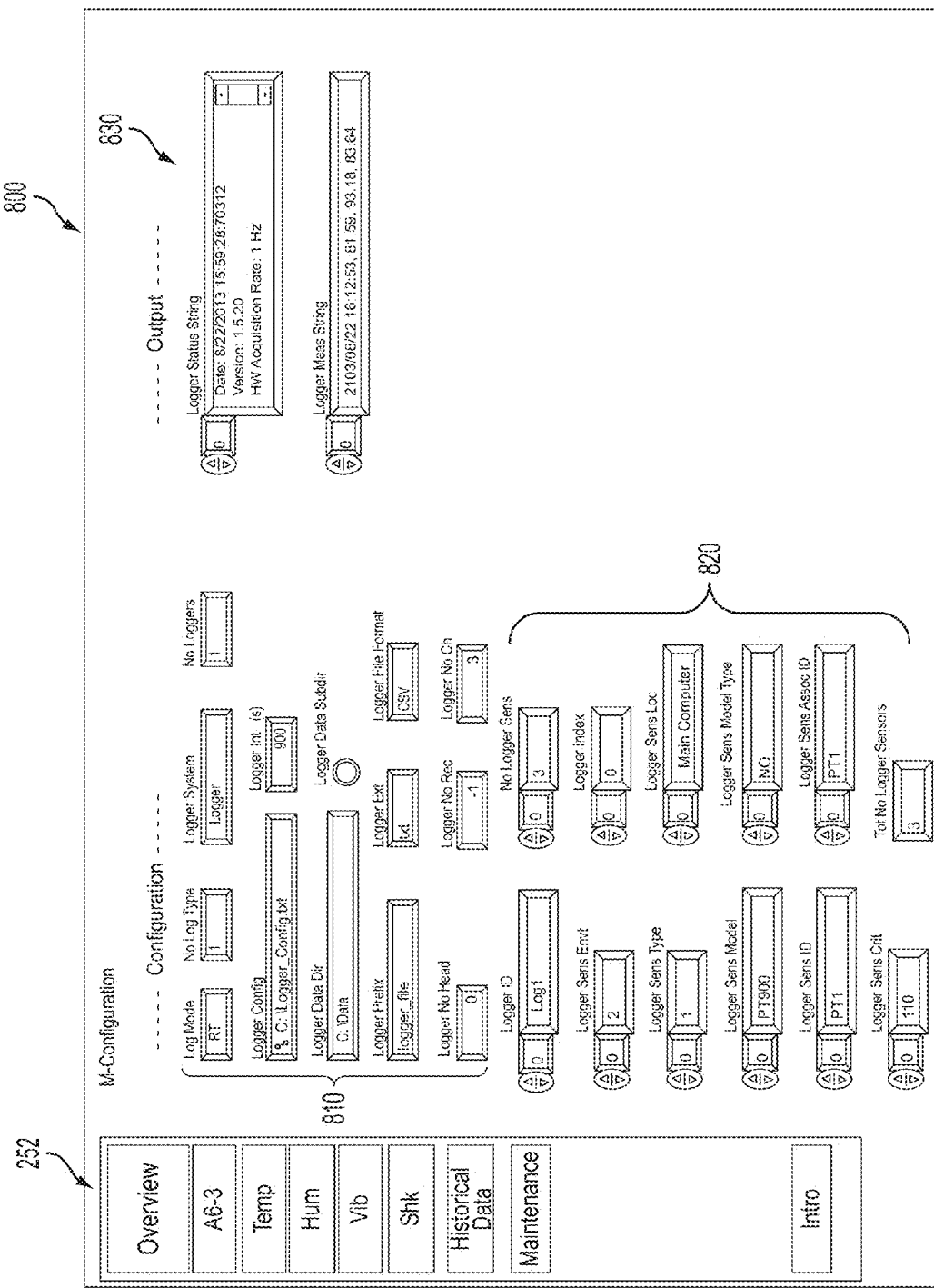
FIG. 25 is an illustrative configuration user interface defining a measurement unit and its associated sensors of the illustrative environmental and condition monitoring system of FIG. 2.

For example, the Input button 602a generates the display in FIG. 23 and the H-Config button 602c generates the display in FIG. 25. The Config button 602 generates a container and instrumentation list. The quasi-static subsystem button 602d transfers to a list of the measurement unit communication and sampling parameters. The Sensor button 602e generates a list of sensor types and their calibrations. The dynamic subsystem button 602f transfers to a list of the measurement unit communication and sampling parameters. The Raw Data button 602g transfers to a display of the data as received from the measurement units. The Health Status 602h button generates a display of the measurements collected by the self-health monitoring subsystem. The Vib-Shk Archive button 602i transfers to a list of waveforms collected by the dynamic measurement unit and archived according to pre-defined criteria. The Run Status button 602j generates a display indicating which subsystems are active, the timestamp of the latest data received from the subsystem, and any associated error conditions. The Controls button 602k allows the operator to turn on/off debug output to support troubleshooting.

FIG. 23 is an exemplary operator input display or graphical user interface (GUI) 620 for accessing operating parameters. Display 620 includes of certain run parameters as well as the program shutdown 622. The program is designed to run without operator intervention, so each parameter has a default value and/or a value specified in the instrumentation configuration. The operator can change some parameters while the program is running Operator Input parameters are divided into three main categories, Vibration-Shock, Alert and Threshold Criteria, and Miscellaneous timing and display-related parameters. For example, on this display an operator can change the shock archive criteria or the frequency of logging system health diagnostics. Normally, an operator would only use this display for program shutdown.

FIG. 24 is an illustrative method 700 to define the instrumentation in a single container 12. This is an example of computer program 200 that may be executed by the central monitoring computer 42 that define the temperature, humidity, shock, and vibration instrumentation shown in FIG. 4. This sample method uses a text file that can be created or modified with many off-the-shelf editors. In general, there is one data record per sensor. Records starting with asterisks describe the data records in the subsequent section. The first section identifies the container and the number of quasi-static and dynamic sensor lines. When a container does not have quasi-static or dynamic sensors, the corresponding number of sensor lines is zero and that section is omitted. The next section 710 defines the quasi-static instrumentation. There is one data record for each of the nine sensors. The sensor definitions include sensor location, type, model number, serial number, and the serial number of any associated sensor. The third section 720 defines the vibration instrumentation and the final section 730 defines the shock instrumentation. The vibration and shock sensor definitions include the accelerometer location, direction, type, and serial number. Sensors with a non-zero wavelength are optical sensors while sensors with a zero wavelength are non-optical.

FIG. 25 is an illustrative configuration display or graphical user interface (GUI) 800 defining the self-health monitoring measurement unit 44 and its associated sensors. The configuration section 810, 820 is derived from measurement unit and sensor definitions, similar to the example in FIG. 24. The measurement unit configuration 810 contains parameters related to the measurement unit and its data output format. Example parameters are the number of loggers, type, and identifier. The sensor configuration 820 defines the sensors attached to the measurement unit. The sensor definitions include sensor environment, type, location, model number, serial number, the serial number of any associated sensor, and a warning level. The output section 830 displays the measurement unit's latest status condition and raw data output. This output could be used for troubleshooting the unit.

An additional illustrative embodiment of the environmental and condition monitoring system 10 of the present disclosure could be used to automatically control environment conditioning equipment, such as heating, cooling, or drying devices. In such an embodiment, the computer 42 would interface with a control unit that would activate or deactivate an environment conditioning device, based upon the environment measured in the container 12 and control algorithms.

In another illustrative embodiment, the environmental and condition monitoring system 10 could collect both environmental measurements and structure conditions at hazardous storage or test sites. In such an application, intrinsically safe, unpowered optical sensors 30 and 32 would be mounted at any site location of interest, including structures. In this embodiment, safety is enhanced because all instrumentation, at the hazardous site, would be both non-radiating and immune to radiation. Plus, because optical cables are low loss, the computer 42 and measurement units 36 and 38 can be located at a safe distance.

Another illustrative embodiment of the environmental and condition monitoring system 10 could be used in deep space exploration. In such an embodiment, scientific devices would be monitored while transported by a spacecraft through the hostile space environment. Because these transport periods can be months-to-years, there is a need to track parameters, such as temperature, vibration, and strain, in order to assess the device's condition prior to use. Unpowered optical sensors may be used in this embodiment. For scientific devices inside a container, optical sensors could be mounted inside the container 12 and/or embedded into the shell of a composite container 12. These unpowered sensors would be immune to electromagnetic radiation from sources such as the solar wind.

Further embodiments of the environmental and condition monitoring system 10 include monitoring geologic formations, such as rock structures, unstable hillsides, faultlines, and volcanoes. In this case, a series of stain, displacement, and possibly vibration sensors could be positioned to detect movement. Optical sensors are ideal, for this embodiment, because dozens of sensors can be positioned along a single fiber optic line up to kilometers in length. This system 10 would create a database of normal geologic movement and, more importantly, it would generate alerts when excessive motion is detected.

Although the invention has been described in detail with reference to certain preferred embodiments, variations and modifications exist within the spirit and scope of the invention as described and defined in the following claims.

The invention claimed is:

1. A maintenance system comprising:
a plurality of containers, each of the containers being sealed and receiving a payload, each payload being sensitive to environmental conditions;
a plurality of sensors received within each of the containers;
wherein the sensors are configured to detect temperature and humidity within the container, and the sensors are further configured to detect vibration and shock on the container;
at least one logging device in communication with the sensors and configured to receive readings of detected temperature, humidity, vibration and shock from the sensors;
wherein the logging device is configured to store a plurality of successive readings of detected temperature, humidity, vibration and shock from the sensors for multiple years;
wherein the logging device interfaces with the sensors from each of the containers;
wherein the logging device is configured to output the readings of detected temperature, humidity, vibration and shock from the sensors to a computer program;
wherein the computer program is configured to compare the readings with known allowable levels for the payload in the container and produce a result indicating a likelihood of failure within each respective said payload within each separate container on a real time basis as a status indicator of the respective payload;
wherein the computer program is further configured to display the status indicator of the payload for all of the containers; and
wherein an operator of the computer program determines which payload to utilize based upon the status indicator of the payload.

2. The maintenance system of claim 1, wherein the payload is sensitive to electromagnetic emissions.

3. The maintenance system of claim 2, wherein each of the sensors comprise fiber optic sensors.

4. The maintenance system of claim 1, wherein the known allowable levels are provided by a manufacturer of the payload.

5. The maintenance system of claim 1, wherein the readings of the sensors are configured to be forwarded to those responsible for the payload to allow them to know the likelihood that a payload requires replacement.

6. The maintenance system of claim 1, further comprising a computer, wherein the computer program is executed by the computer, and wherein a self-health monitoring subsystem keeps track of a self-health data associated with said system's hardware and computer including operational status of the maintenance system's sensors and communication interfaces as well as a logging device interfaces with sensors to receive readings of detected temperature from sensors attached to system hardware; said self-health monitoring subsystem is further configured for reporting said self-health data back to the computer program.

7. The maintenance system of claim 6, wherein said self-health data further comprises available disk space in a memory to store data comprising said plurality of successive readings and said self-health data.

8. The maintenance system of claim 7, wherein said self-health data further comprises operational status and ability of the computer.

9. The maintenance system of claim 1, wherein said computer program is further configured to selectively generate a user interface to display a self-health data.

10. The maintenance system of claim 1, wherein at least some of said sensors comprise multiple sensors of same type disposed in multiple locations within each said container.

11. The maintenance system as in claim 10, wherein the multiple sensors respectively comprise a plurality of temperature, humidity, vibration, and shock sensors disposed at a plurality of locations within said container.

12. The maintenance system as in claim 11, wherein the multiple sensors comprising the plurality of temperature, humidity, vibration, and shock sensors are respectively disposed in proximity to equipment which has a predetermined and different sensitivity to temperature, humidity, vibration, and shock.

13. The maintenance system as in claim 12, wherein at least some of the multiple sensors are located at a first, second, and third location in said containers.

14. The maintenance system as in claim 13, wherein said first and third locations are at opposing sections of said containers and said second location is disposed between said first and third locations.

15. An environmental and condition monitoring system comprising:
a plurality of containers, wherein each container contains an asset;
wherein the asset is sensitive to the one or more environmental conditions within or impacting one or more said plurality of containers comprising quasi-static environments and dynamic environments;
a plurality of first and second sensors operably coupled to or within each respective container;
wherein the first sensors detect said quasi-static environments in each respective container, wherein said quasi-static environment includes environmental changes having a first rate of change comprising a rate of temperature change and humidity change in the quasi-static environment, wherein said first sensors have a first sensor measurement acquisition rate and a selectively set second measurement output rate that is different than the first sensor measurement rate;
wherein the second sensors detect said dynamic environments impacting on the container, wherein said second sensors' detection comprises measuring said dynamic environment and outputting a waveform data collection including a plurality of samples taken per unit of time from said second sensors, wherein said per unit of time is at least one thousand times per second;

a first and second measurement devices respectively interfacing with the first and second sensors from the plurality of containers;

a central computer including a computer program stored on and read from a non-transitory machine readable storage device associated with or within said central computer and executed by the central computer and a memory, wherein the first and second measurement devices reports said first and second sensor readings to the central computer for processing executed by the computer program;

wherein the computer program is configured to operate said central computer to respectively compare the first and second sensor's readings with previously input and stored preset acceptable levels for each said asset in each said container and produce a result indicating status of the first and second sensors readings on a real time basis;

wherein the computer program is configured to be read by the central computer which executes the computer program to display the status derived from the first and second sensors of all of the containers;

wherein the central computer is configured to read the computer program and execute the computer program to operate the memory of the computer to store the first and second sensors' readings from the first and second measurement devices for a plurality of years, wherein said central computer reads said computer program and stores said waveform into said memory per a predetermined memory management scheme comprising retention criteria comprising all waveforms, waveforms that exceed a predetermined threshold, a predetermined number of waveforms over a predetermined time frame, a predetermined number of waveforms associated with a highest magnitude sensor measurement from a plurality of the sensor readings, or a combination of said retention criteria;

wherein the computer program is further configured to operate said central computer which then shows historical data of the first and second sensor readings and output from said first and second measurement devices for each container; and a display configured to output one or more user interfaces generated by said central computer after reading said computer program, wherein said one or more user interfaces are configured to selectively generate said user interfaces to enable an operator of the computer program to output on said display and receive access to one or more real time status of all the containers and to the historical data for each container.

16. The environmental and condition monitoring system of claim 15, wherein each said container is sealed from an environment external to the containers.

17. The environmental and condition monitoring system of claim 15, wherein the quasi-static environmental conditions include temperature and humidity, and the dynamic environmental conditions include vibration and shock.

18. The environmental and condition monitoring system of claim 15, wherein the asset is sensitive to electromagnetic emissions.

19. The environmental and condition monitoring system of claim 18, wherein the first and second sensors are unpowered fiber optic sensors.

20. The environmental and condition monitoring system of claim 15, wherein the second sensors are powered piezoelectric sensors.

21. The environmental and condition monitoring system of claim 15, wherein the preset acceptable levels are known levels provided by an owner of the asset.

22. The environmental and condition monitoring system of claim 15, wherein said system further comprises a remote reporting section configured to selectively send reporting data comprising the stored readings and outputs from said first and second measurement devices to near and remote computer network node sites to display said reporting data to expert personnel that oversee the container asset to be used in making maintenance decisions including another computer and display located at said remote computer network node sites comprising other support areas including damage and maintenance support computer node sites.

23. The environmental and condition monitoring system of claim 15, further comprising:

a third measurement device and a plurality of third sensors associated with the first and second measurement devices and the central computer, said third sensors configured to detect operating parameter condition data associated with the central computer, the first measurement device, and the second measurement device, said operating parameter condition data comprises temperature and humidity; and an equipment health monitoring subsystem section of said computer program that operates said central computer to receive a plurality of health measurements of environmental and condition monitoring system comprising said operating parameter condition data, power levels of the first, second, and third sensors, a plurality of communication interfaces between one or more components of said environmental and condition monitoring system, active versus failed status of said first, second, and third sensors, available data storage medium space of said non-transitory machine readable storage device, and available said memory of said central computer;

wherein the computer program further is configured to be read by and operate said central computer to receive and store significant system health operating parameters of the central computer, the first measurement device, and the second measurement device associated with operational or system failure comprising online/offline status and online with errors or system degradation of said central computer, said first measurement device, or said second measurement device; and wherein the computer program is configured to be read and executed by the central computer for comparing the plurality of health measurements of the environmental and condition monitoring system and the system health operating parameters to preset allowable levels to produce a system health measurement status on a real time basis and selectively display said report on said one or more user interfaces.

24. A method of monitoring environmental conditions within a container, the method comprising the steps of:

detecting quasi-static environmental conditions within the container through a first plurality of sensors;

acquiring the detected quasi-static environmental conditions from said first plurality of sensors with a quasi-static measurement unit;

detecting dynamic environmental conditions on the container through a second plurality of sensors;

acquiring the detected dynamic environmental conditions from said second plurality of sensors with a dynamic measurement unit, said acquired detected dynamic environmental conditions data output comprising a waveform data collection including a plurality of samples taken per unit of time from said second sensors;

reporting measurement readings from the quasi-static measurement unit and the dynamic measurement unit to a central computer;

comparing the measurement readings with preset acceptable levels for an asset within each container;

producing a result indicating measurement status on a real time basis;

displaying the measurement status for each of the containers;

storing the detected measurement readings for each container for multiple years;

displaying historical data of the measurement readings for each container.

25. The method of claim 24, wherein the first and second measurement units interface with said first and second plurality of sensors disposed within a plurality of said containers.

26. The method of claim 24, wherein an operator recommends or determines that an asset within said container become inactive based upon the status.

27. The method of claim 24, wherein the asset within each container is sensitive to electromagnetic emissions, and the sensors are unpowered.

28. The method of claim 27, wherein the sensors are fiber optic sensors.

29. The method of claim 24, wherein the second sensors are piezoelectric sensors.

30. The method of claim 24, wherein the acceptable levels of the asset are known levels provided by an owner of the asset.

31. The method of claim 24, further comprising the step of forwarding to expert personnel to oversee the container asset to be used in making maintenance decisions.

32. The method of claim 24, further comprising the steps of:

tracking operating parameters of a computer and measurement units;

comparing the operating parameters to allowable levels to produce an operational status on a real time basis; and an operator of a computer program deciding whether to perform maintenance on a system for executing said method.

33. A containment system comprising:

a plurality of containers arranged in a group, each container including:
an outer shell defining a chamber to receive an asset; and
a lid operably coupled to the outer shell and configured to cover the chamber;

a sensor suite associated with each of the plurality of containers, the sensor suite including:
a plurality of first sensors to detect quasi-static environmental conditions in each said container, the plurality of first sensors received within the chamber of each said container; and
a plurality of second sensors to detect dynamic environmental conditions on the container, the plurality of second sensors operably coupled to the outer shell and longitudinally spaced along the container;

a controller in communication with the sensor suite, the controller including measurement devices and a central computer having a computer program and a memory, the first and second sensors providing signals to the measurement devices, the measurement devices providing measurement readings to the central computer based upon the signals from the first and second sensors, wherein data output from one of said measurement devices comprising a waveform data collection including a plurality of samples taken per unit of time from said plurality of second sensors;

a user interface including a display in communication with the controller;

wherein the memory includes preset acceptable measurement levels, the computer program configured to compare the measurement readings with the preset acceptable measurement levels for the asset in the container; and wherein the display is configured to provide a graphical representation of the plurality of containers, each container representation including an indicator representative of measurement status on a real time basis.

34. The containment system of claim 33, wherein historical measurement readings are stored within the memory, the computer program configured to show the historical measurement readings on the display for each of the containers.

35. The containment system of claim 33, wherein the asset within the container is sensitive to electromagnetic emissions, and the sensors are unpowered.

36. The containment system of claim 35, wherein the sensors are fiber optic sensors.

37. The containment system of claim 33, wherein the second sensors are piezoelectric sensors.

38. The containment system of claim 33, wherein the preset acceptable measurement levels of the asset are known levels provided by an owner of the asset.

39. The containment system of claim 33, further comprising a transmitter for transmitting to expert personnel to oversee the container asset to be used in making maintenance decisions.

40. The containment system of claim 33, wherein:

at least one sensor associated with the measurement devices and the central computer, and configured to detect operating parameters associated with the measurement devices and the central computer;

an equipment monitoring measurement unit interfacing with the central computer, wherein the equipment monitoring measurement unit acquires and reports measurements to the computer program;

wherein the computer program tracks significant operating parameters of the central computer;

wherein the computer program compares the measurements and the operating parameters to preset allowable levels to produce an operational status on a real time basis; and wherein an operator of the computer program decides whether to perform maintenance on the containment system.

41. An environmental and condition monitoring system comprising:

a sensor suite associated with each of a plurality of containers, the sensor suite including:
first sensors to detect quasi-static environmental conditions in the container; and
second sensors to detect dynamic environmental conditions on the container;

a controller in communication with the sensor suite, the controller including measurement devices and a central computer having a computer program and a memory, the first and second sensors providing signals to the measurement devices, the measurement devices providing measurement readings to the central computer based upon the signals from the first and second sensors, wherein data output from one of said measurement devices comprising a waveform data collection including a plurality of samples taken per unit of time from said plurality of second sensors;

a user interface including a display in communication with the controller;

wherein the memory includes preset acceptable measurement levels associated with an asset in the container, the computer program configured to compare the measurement readings with the preset acceptable measurement levels for the asset in the container;

wherein the controller is configured to provide on the display an overview graphical representation of the plurality of containers, the overview graphical representation including an indicator representative of measurement status of each container on a real time basis; and wherein the controller is further configured to provide on the display a detailed container graphical representation of an individual container, the detailed container graphical representation including status indicators for each sensor associated with the container and detailed measurement readings on a real time basis.

42. The environmental and condition monitoring system of claim 41, wherein the memory of the computer stores the measurements for a plurality of years, the controller being configured to provide on the display a graphical representation including detailed historical measurement readings.

43. The environmental and condition monitoring system of claim 41, wherein the quasi-static environmental conditions include temperature and humidity, and the dynamic environmental conditions include vibration and shock.

44. The environmental and condition monitoring system of claim 41, wherein the sensors are unpowered fiber optic sensors.

45. The environmental and condition monitoring system of claim 41, wherein the second sensors are powered piezoelectric sensors.

46. The environmental and condition monitoring system of claim 41, wherein the preset acceptable levels are known levels provided by an owner of the asset.

47. The environmental and condition monitoring system of claim 41, wherein:

the first sensors are received within an internal chamber defined by an outer shell of the container; and the second sensors operably coupled to the outer shell of the container and longitudinally spaced along the container.

\* \* \* \* \*